(12) United States Patent
Campbell

(10) Patent No.: US 12,459,030 B2
(45) Date of Patent: Nov. 4, 2025

(54) WHEEL CONSTRUCTED WITH HYBRID SPOKE ASSEMBLIES

(71) Applicant: Richard V. Campbell, Havana, FL (US)

(72) Inventor: Richard V. Campbell, Havana, FL (US)

( * ) Notice: Subject to any disclaimer, the term of this patent is extended or adjusted under 35 U.S.C. 154(b) by 0 days.

(21) Appl. No.: 18/234,082

(22) Filed: Aug. 15, 2023

(65) Prior Publication Data

US 2024/0149327 A1 May 9, 2024

Related U.S. Application Data

(63) Continuation-in-part of application No. 17/858,411, filed on Jul. 6, 2022, now Pat. No. 11,884,100.

(51) Int. Cl.
| | |
|---|---|
| *B21D 53/26* | (2006.01) |
| *B21D 39/06* | (2006.01) |
| *B60B 1/02* | (2006.01) |
| *B60B 1/04* | (2006.01) |

(52) U.S. Cl.
CPC ........... *B21D 53/268* (2013.01); *B21D 39/06* (2013.01); *B60B 1/0261* (2013.01); *B60B 1/044* (2013.01); *B60B 2310/211* (2013.01); *B60B 2320/10* (2013.01)

(58) Field of Classification Search
CPC .............................. B60B 1/0261; B60B 1/003
See application file for complete search history.

(56) References Cited

U.S. PATENT DOCUMENTS 8,985,709 B2 * 3/2015 Schlanger ............. B60B 21/062
301/55

* cited by examiner

*Primary Examiner* — Jason L Vaughan
*Assistant Examiner* — Amanda Kreiling
(74) *Attorney, Agent, or Firm* — J. Wiley Horton

(57) ABSTRACT

A method of making a wheel assembly using hybrid spokes that combines a synthetic fiber cable with an outer rod segment connected to a rim and an inner rod segment connected to a hub. An anchor is used to connect each end of the fiber cable to a length of conventional rod, preferably through the use of a swaging operation. Each rod segment includes a standard end feature on its free end—such as a threaded shaft or J-bend. The hybrid assembly can preferably be retrofitted to applications that now use a conventional rod or wire. This allows synthetic fiber cables—with their unique mechanical properties—to be incorporated in existing designs.

20 Claims, 30 Drawing Sheets

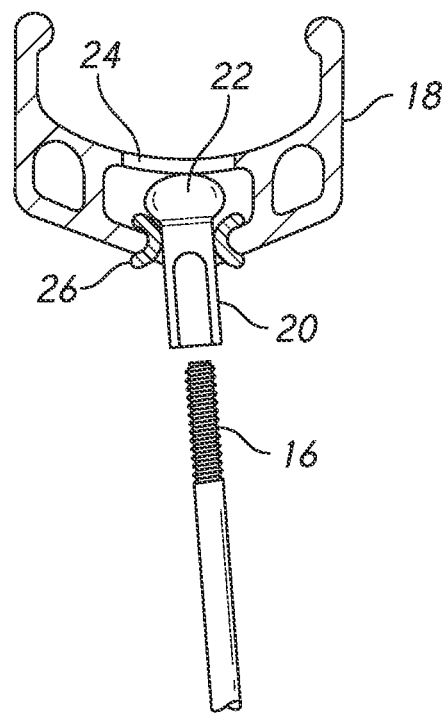
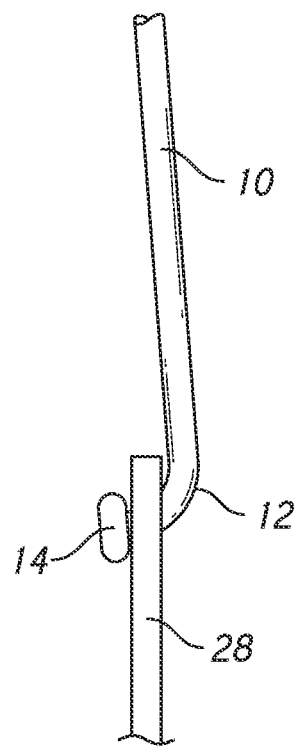
FIG. 1
(Prior Art)

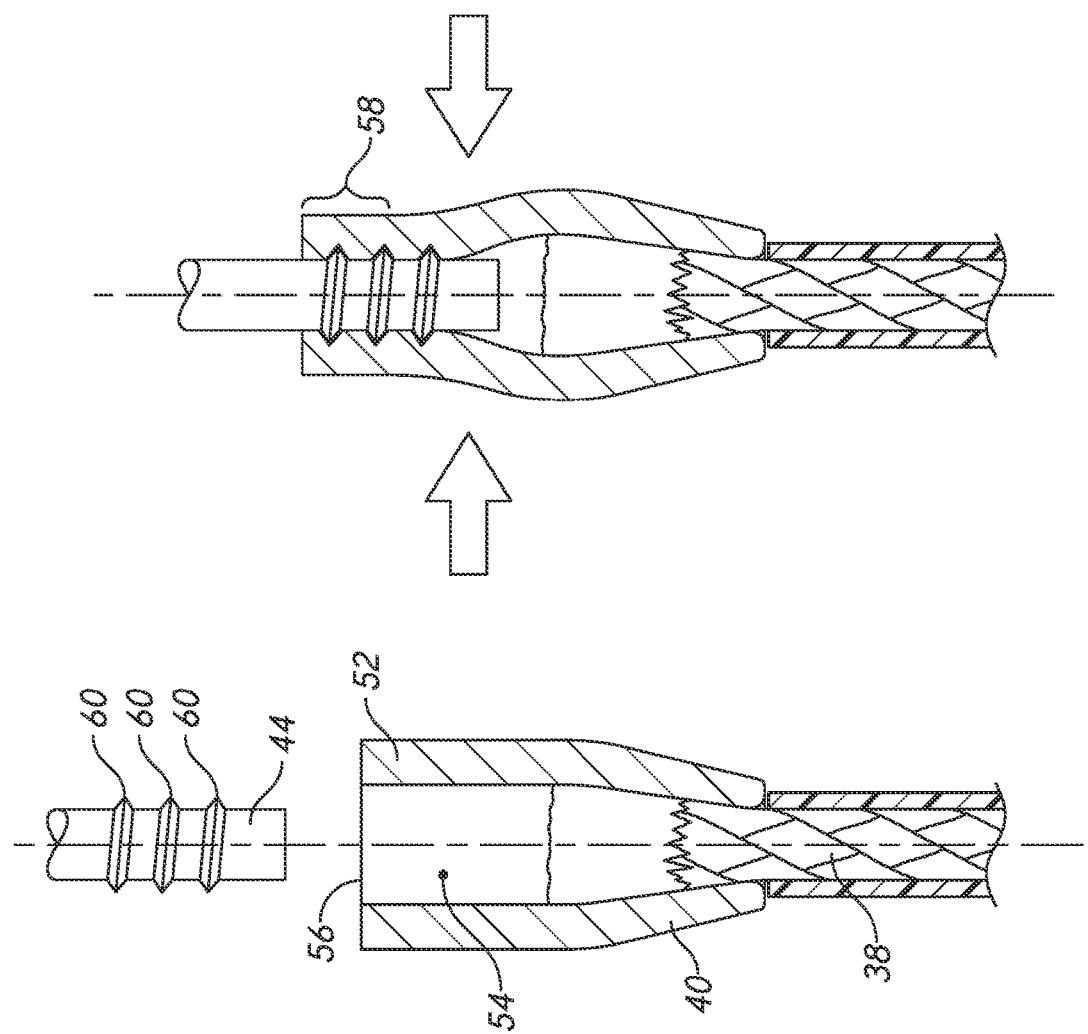

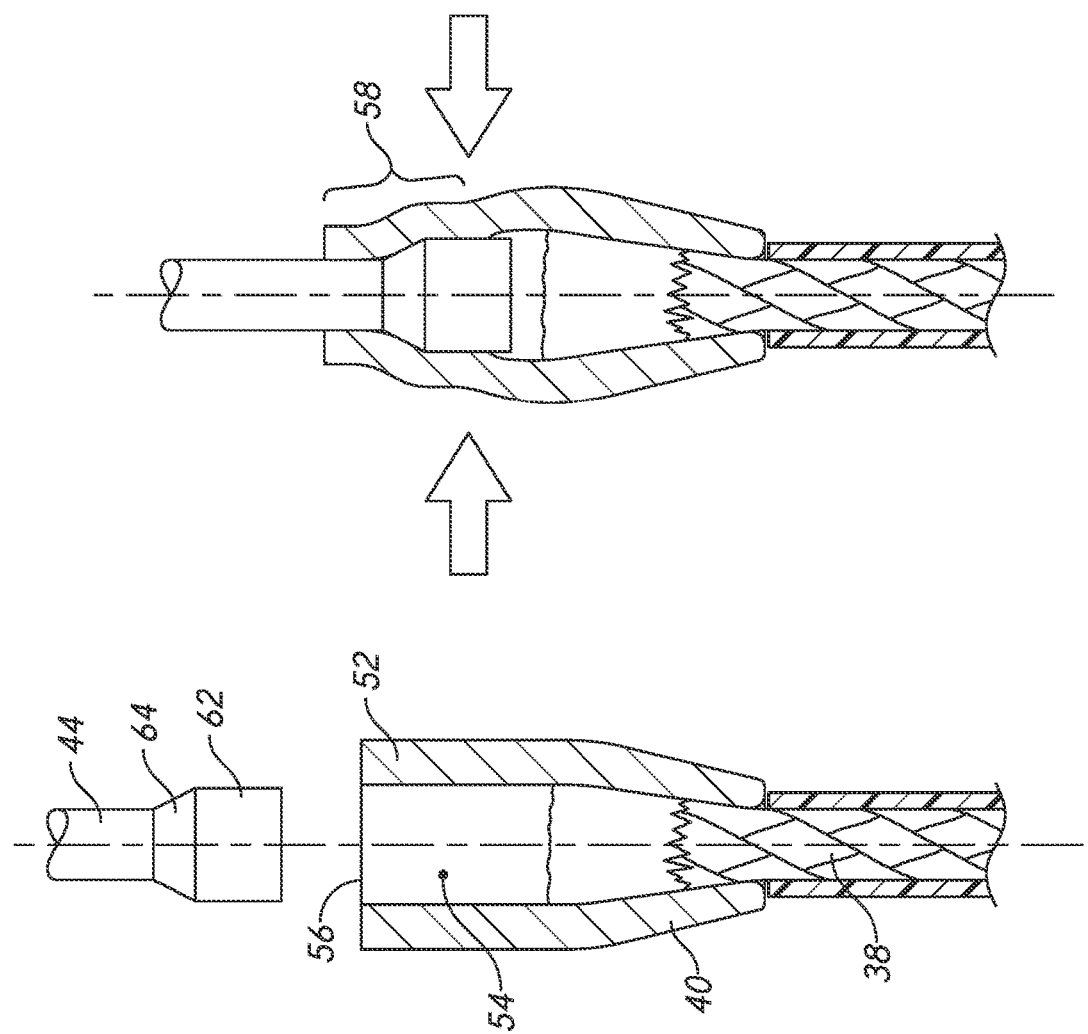

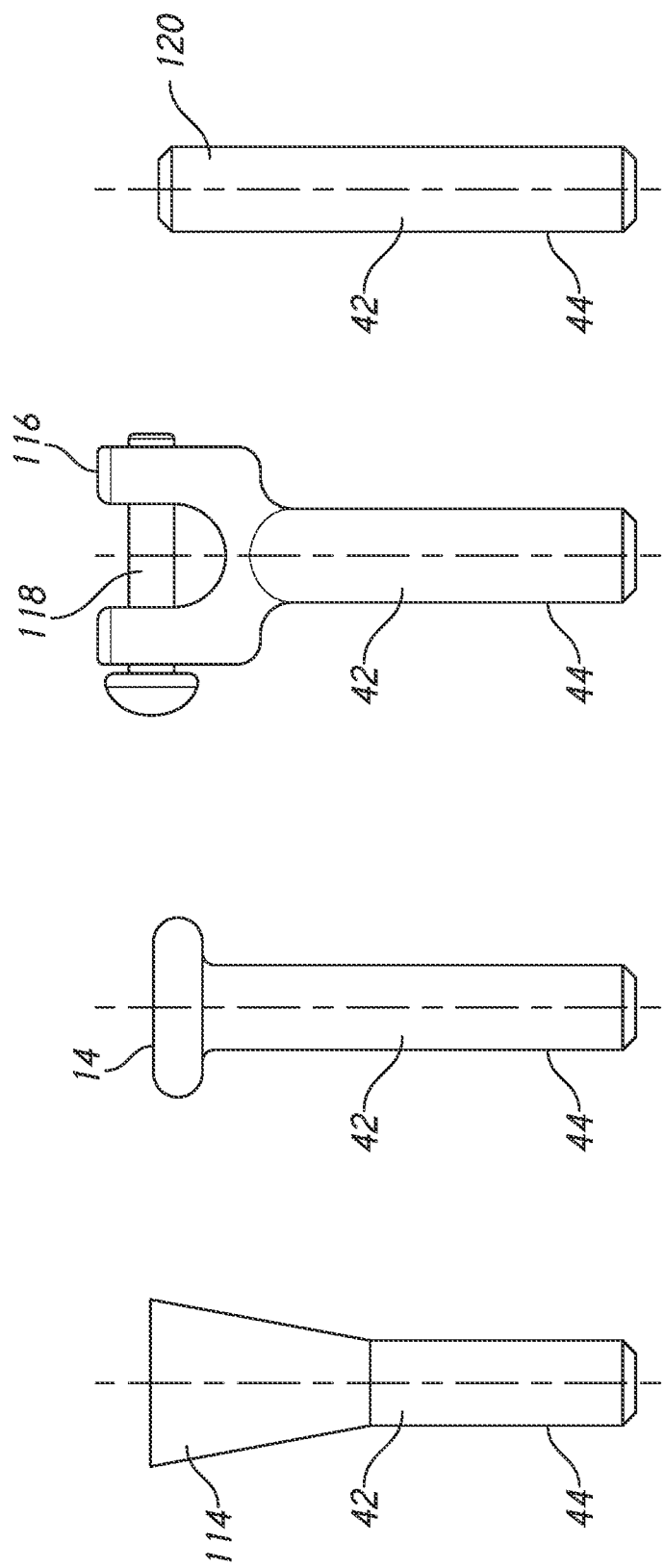

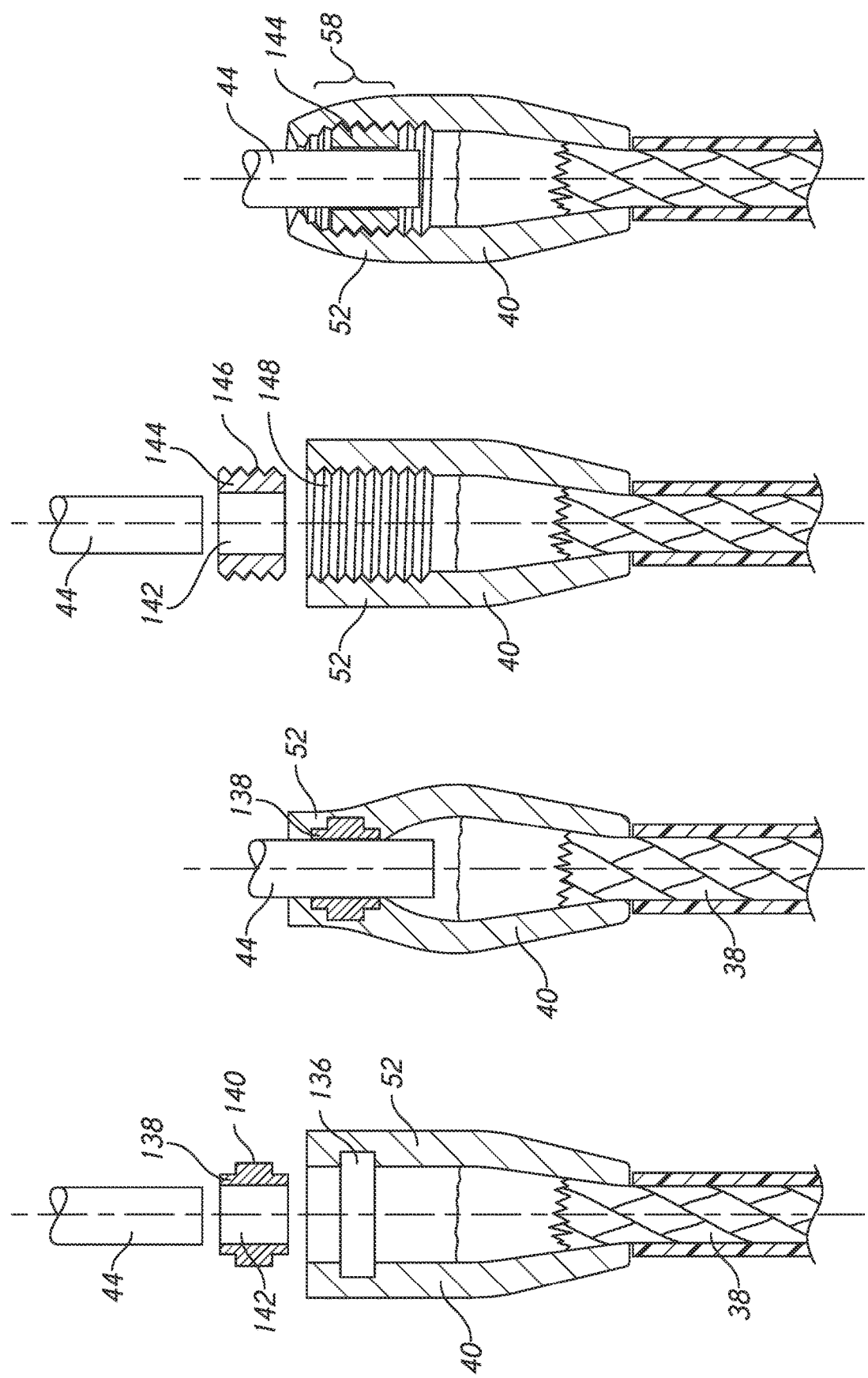

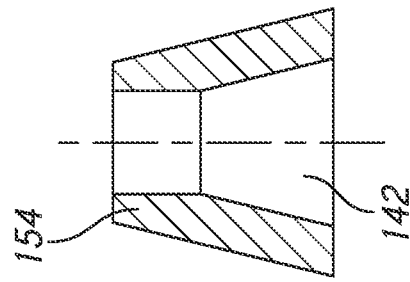
FIG. 4.3E
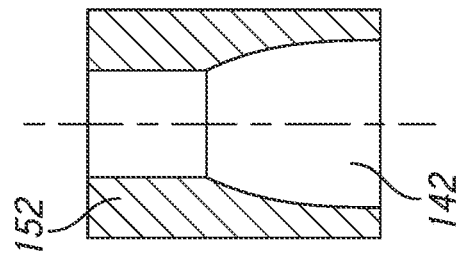
FIG. 4.3D
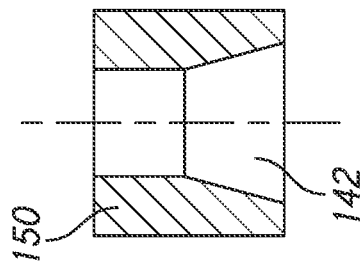
FIG. 4.3C
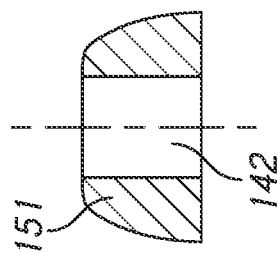
FIG. 4.3B
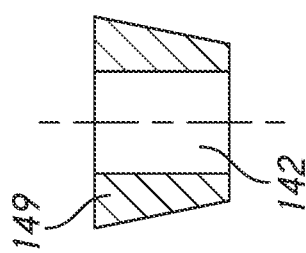
FIG. 4.3A

WHEEL CONSTRUCTED WITH HYBRID SPOKE ASSEMBLIES

CROSS-REFERENCES TO RELATED APPLICATIONS

This patent application is a continuation-in-part of U.S. patent application Ser. No. 17/858,411. Application Ser. No. 17/858,411 listed the same inventor and was filed on Jul. 15, 2022. In addition, this application also claims the benefit of the filing date of Provisional Application No. 63/397,721. Provisional Application 63/397,921 listed the same inventor and was filed on Aug. 15, 2022.

STATEMENT REGARDING FEDERALLY SPONSORED RESEARCH OR DEVELOPMENT

Not Applicable.

MICROFICHE APPENDIX

Not Applicable

BACKGROUND OF THE INVENTION

1. Field of the Invention

This invention relates to the field of tensile strength members. More specifically, the invention comprises a method for connecting a flexible synthetic fiber rope or cable tension member to one or more rigid rod tension members.

2. Description of the Related Art

A rod—whether made of metal, an organic material, or a composite material—is an efficient tensile strength member. Rods are simple. Rods are very compact. Rods can be provided with a wide variety of end connecting features—such as threads, an expanded lug, a loading eye, etc. Steel is a very common material for prior art tensile strength rods. It is also known to make tensile strength rods using pultruded carbon fiber, glass fiber, or other materials.

The present invention proposes to substitute a flexible cable made of synthetic filaments for a portion of the length of a conventional rod—thereby producing a hybrid construction. The present invention also seeks to retain the use of standard end fittings for the hybrid construction. Each field of application will have its own standard end fittings and its own space constraints for an attempted retrofit. The invention is adaptable to many diverse fields of application.

The creation of a hybrid assembly has advantages over the prior art unitary construction in many respects. However, the space efficiency of a conventional rod likely cannot be surpassed. The creation of a joint between a flexible cable and a prior art rod segment produces an enlarged segment in the region of the joint. The present invention seeks to minimize the enlargement so that the hybrid assembly can be substituted for existing unitary constructions.

A well-known application for tensile strength rods is in the construction of spoked wheels. As an example, bicycle wheels are often made by "lacing" a number of rods between a central hub and an outer rim. The rods in this context are known as "spokes." Bicycle wheels are an obvious application for the present invention. Accordingly, many of the exemplary illustrations pertain to bicycle wheels. The reader should bear in mind, however, that the invention has many other applications and that the scope of the invention is by no means limited to spoked wheels.

FIG. 1 shows a partial elevation view of a bicycle wheel—the structure of which will be familiar to those skilled in the art. Flange 28 is attached to the wheel's hub and may in fact be integral to the hub. Rim 18—which is shown in section—forms the wheel's perimeter. The tire and tube are not shown for purposes of visual clarity, but these additional components attach to rim 18.

Spoke 10 is one of a set of spokes that are laced between flange 28 and rim 18. It is common to use 24 to 36 spokes to lace a wheel. Those skilled in the art will know that many different fastening components are used in wheel lacing. FIG. 1 shows a common and representative prior art configuration. The inner portion of each spoke 10 is connected to flange 28 by passing the spoke—starting with threaded end 16—through a transverse hole in flange 28. Expanded head 14 is too large to pass through this transverse hole and it arrests further passage of the spoke. The final position is as shown. J-bend 12 provides an approximately 90-degree bend so that spoke 10 has the correct orientation.

Nipple 20 is pressed inward through passage 24. Head 22 stops further inward movement of the nipple once head 22 comes to rest against grommet 26. In this example grommet 26 is a steel piece that is plastically deformed in order to lock it to rim 18—which is made of a lighter alloy. In other known arrangements the grommet will simply be integral to the rim itself.

Nipple 20 has a female threaded passage configured to engage threaded portion 16 on the outer end of the spoke. The nipple also has two or more wrench flats that can be easily engaged to turn the nipple. A person building a wheel "laces" all the spokes and all the nipples into position before beginning to adjust the spoke tension. Once the nipples are threaded onto the ends of the spokes the reader will appreciate that turning the nipples will adjust the tension applied to the spokes.

Rod tensile members are inherently compact, and this is one of their main advantages. FIG. 2 provides an elevation view of a bicycle wheel in the vicinity of hub 30. The reader will note that the spokes do not simply radiate outward in a direction that is perpendicular to an intersection with the tangent point on the rim. Rather, the spokes 10 are deliberately crossed over each other in offset directions. There are many known lacing configurations. The one shown in FIG. 2 is a "two-cross" arrangement. The reader will note how each spoke crosses a first additional spoke at first crossing point 34 and a second additional spoke at second crossing point 36. The spokes shown are secured to flange 28 using J-bends. The reader will observe how the orientation of each J-bend is reversed with respect to its neighbors. On one spoke the view of FIG. 2 allows only the view of a J-bend going through a hole 32 in flange 28. For the two adjacent spokes the view of the hole is blocked by a head 14.

The interrelationship of the spokes is complex. The view of FIG. 2 shows only the driveside flange 28—the side where the chain engages the gears. Hub 30 includes a second flange (the non-driveside flange) as well, and this second flange hosts the same number of connected spokes. The numerous spoke crossing points and overlapping geometry means that a bulky hybrid assembly cannot be substituted for the slender spokes. Any substitute assembly configured to replace the classic bicycle spoke is limited by these significant space constraints. Additionally, any changes in the geometry of the end points means that conventional hubs and rims cannot be used.

Another factor in attempting to create the inventive hybrid assembly is the need to use numerous standard end features common to spoked wheels. FIG. 3 depicts a small sample of these standard end features. The upper spoke includes a male-threaded end, with female-threaded nipple 20 installed on that end. The middle spoke 10 includes J-bend 12 with incorporated head 14. The lower spoke (sometimes called a "straight-pull" spoke) incorporates an expanded head 14 on its end. Many other end fittings exist in the field of bicycle wheels. Of course, other fields have many more and diverse types of standard end features.

In the present invention a flexible cable made of high-strength synthetic filaments must generally be connected to a conventional rod made of metal or non-metallic materials. The term "cable" should be understood to encompass any flexible tensile strength member, including cables, ropes, cords, strands, tendons, etc. The term "cable" should not be understood to encompass rigid structures. To make the hybrid cable and rod assembly, an anchor is preferably affixed to each end of the cable. The anchor can be affixed by mechanical means—such as a cone-and-spike socket, clamping around a thimble, weaving a cable around a cross pin and back into itself, etc. The anchor can also be affixed to the cable by potting. In a potting process, a length of strands is placed within a cavity in the anchor and liquid potting compound is introduced around and within the strands in the cavity (either before, during, or after the strands are placed in the cavity). The term "potting compound" as used in this description means any substance which transitions from a liquid to a solid over time. Examples include molten lead, thermoplastics, and UV-cure or thermoset resins (such as two-part polyesters or epoxies). Other examples include plasters, ceramics, and cements. The term "solid" is by no means limited to an ordered crystalline structure such as found in most metals. In the context of this invention, the term "solid" means a state in which the material does not flow significantly under the influence of gravity. Thus, a soft but stable wax is yet another example of such a solid. Once the potting compound is solidified, the anchor is attached to the end of the cable. Many known approaches to adding an anchor to a cable are explained in detail in commonly-owned U.S. Pat. Nos. 7,237,336; 8,048,357; 8,236,219; 8,371,015; and 10,543,573—all of which are hereby incorporated by reference.

Many different synthetic filaments (sometimes synonymously referred to as "fibers") are used for creating the type of cables that can be incorporated in the hybrid assemblies of the present invention. These include DYNEEMA (ultra-high-molecular-weight polyethylene), SPECTRA (ultra-high-molecular-weight polyethylene), TECHNORA (aramid), TWARON (p-phenylene terephthalamide), KEVLAR (para-aramid synthetic fiber), VECTRAN (a fiber spun from liquid-crystal polymer), PBO (poly(p-phenylene-2,6-benzobisoxazole)), carbon fiber, and glass fiber (among many others). In general, the individual filaments have a thickness that is less than that of human hair.

Those skilled in the art will know that cables made from synthetic filaments have a wide variety of constructions. Some cables have a parallel core of filaments surrounded by a jacket of braided filaments. In other cases the cable may be braided throughout. In still other examples the cable construction may be: (1) an entirely parallel construction enclosed in a jacket made of different material, (2) a helical "twist" construction, or (3) a more complex construction of multiple helices, multiple braids, or some combination of helices and braids.

The term "anchor" should be viewed broadly to encompass virtually anything that can be attached to a flexible rope or cable. A single anchor may be attached to the entire cable. In other cases an anchor may be attached to each strand (or other subgroup) of a cable so that a single end of a cable has multiple anchors. These multiple anchors are then typically gathered together by one or more additional components called collectors. An anchor ordinarily includes some feature or features facilitating attachment—such as a flange, square end, hook, or a threaded shaft.

In many instances the substitution of a cable with synthetic filaments offers an advantage in performance—such as improved shock and fatigue resistance, improved dampening (by introducing the viscoelastic properties of the synthetic cable), an improved strength-to-weight-ratio, or improved dampening. In some applications the present invention may be desirable because it actually offers less stiffness and different viscoelastic properties. This is particularly true for a hybrid assembly configured to substitute for a conventional steel bicycle spoke. The use of certain synthetic filaments in a hybrid spoke assembly produces a smoother ride for a bicyclist. This is the result of the unique viscoelastic properties of certain filaments, as will be explained in the detailed disclosure. The inclusion of a longer or shorter portion of synthetic cable within the overall length of the spoke can actually serve to "tune" the mechanical properties of the hybrid assembly in order to produce desired properties.

The present invention seeks to exploit the advantageous properties of hybrid tensile members, while retaining the ability to use standardized end features. In order to do so, the invention must overcome several disadvantages inherent in the components being used. One objective is for all the components in the hybrid assembly to retain the overall breaking strength of the rod segment alone. Under this scheme, it is common for the flexible cable's diameter to be 1.5 to 3.0 times the diameter of the rod. In addition, the anchor that is commonly potted to the end of the flexible cable often has a diameter that is 2.0 to 3.0 times the diameter of the cable. Thus, the overall anchor diameter may be 3.0 to 9.0 times the diameter of the rod. This fact makes the connection between the cable and the rod significantly bulkier than the rod itself. An objective of the present invention is minimizing the bulk of this connection. Another objective is placing the bulk in a region where space is available. Additional objectives include (1) the ability to retrofit the hybrid assembly into prior art unitary construction applications, (2) the ability to provide mechanical characteristics not available with the prior art unitary construction, and (3) the ability for the connection to meet or exceed the strength of the rod itself. These and other objects and advantages are explained in the detailed description to follow.

BRIEF SUMMARY OF THE PRESENT INVENTION

The present invention comprises a method and system for creating a hybrid tensile member combining a synthetic fiber cable and a rigid rod. An anchor is attached to one or more ends of the synthetic cable. The anchor is used to connect an end of the fiber cable to a length of conventional rod, preferably through the use of a swaging operation. Each rod segment includes a standard end feature on its free end—such as a threaded shaft or J-bend. The hybrid assembly can preferably be retrofitted to applications that now use a conventional rod or wire. This allows synthetic fiber cables—with their unique mechanical properties—to be incorporated in existing designs.

BRIEF DESCRIPTION OF THE SEVERAL VIEWS OF THE DRAWINGS

FIG. 1 is an elevation view with a partial section, showing a prior art spoked bicycle wheel assembly.

FIG. 8 is a sectional elevation view, showing a rod end with three additional circumferential ribs having a triangular profile.

FIG. 9 is a sectional elevation view, showing the assembly of FIG. 8 after swaging.

FIG. 10 is a sectional elevation view, showing a rod end with an enlarged end portion.

FIG. 11 is a sectional elevation view, showing the assembly of FIG. 10 after swaging.

FIG. 34A is an elevation view, showing a rod segment with a tapered expansion.

FIG. 34B is an elevation view, showing a rod segment with an expanded head.

FIG. 34C is an elevation view, showing a rod segment with a yoke.

FIG. 34D is an elevation view, showing a cylindrical rod segment.

FIG. 36C is a sectional view, showing a square swage.

FIG. 39 is a sectional elevation view, showing the use of an insert as part of the swaged interface.

FIG. 40 is a sectional elevation view, showing the assembly of FIG. 39 after swaging.

FIG. 41 is a sectional elevation view, showing the use of a threaded insert as part of the swaged interface.

FIG. 42 is a sectional elevation view, showing the assembly of FIG. 41 after swaging.

FIG. 43A is a sectional elevation view, showing a swaging insert.

FIG. 43B is a sectional elevation view, showing a swaging insert.

FIG. 43C is a sectional elevation view, showing a swaging insert.

FIG. 43D is a sectional elevation view, showing a swaging insert.

FIG. 43E is a sectional elevation view, showing a swaging insert.

Figure 2:
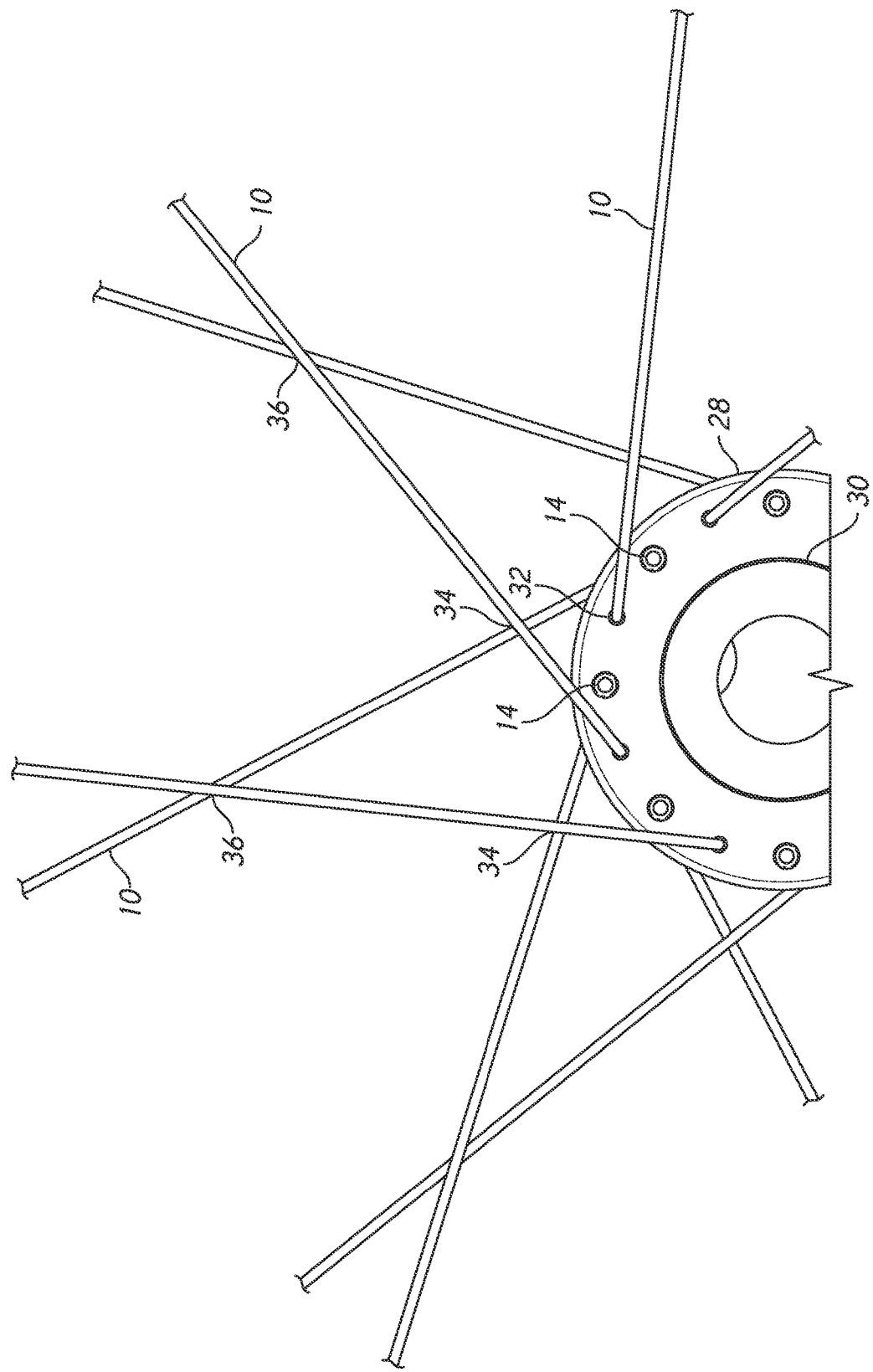
FIG. 2 is a detailed elevation view, showing a prior art bicycle wheel assembly.
Figure 3:
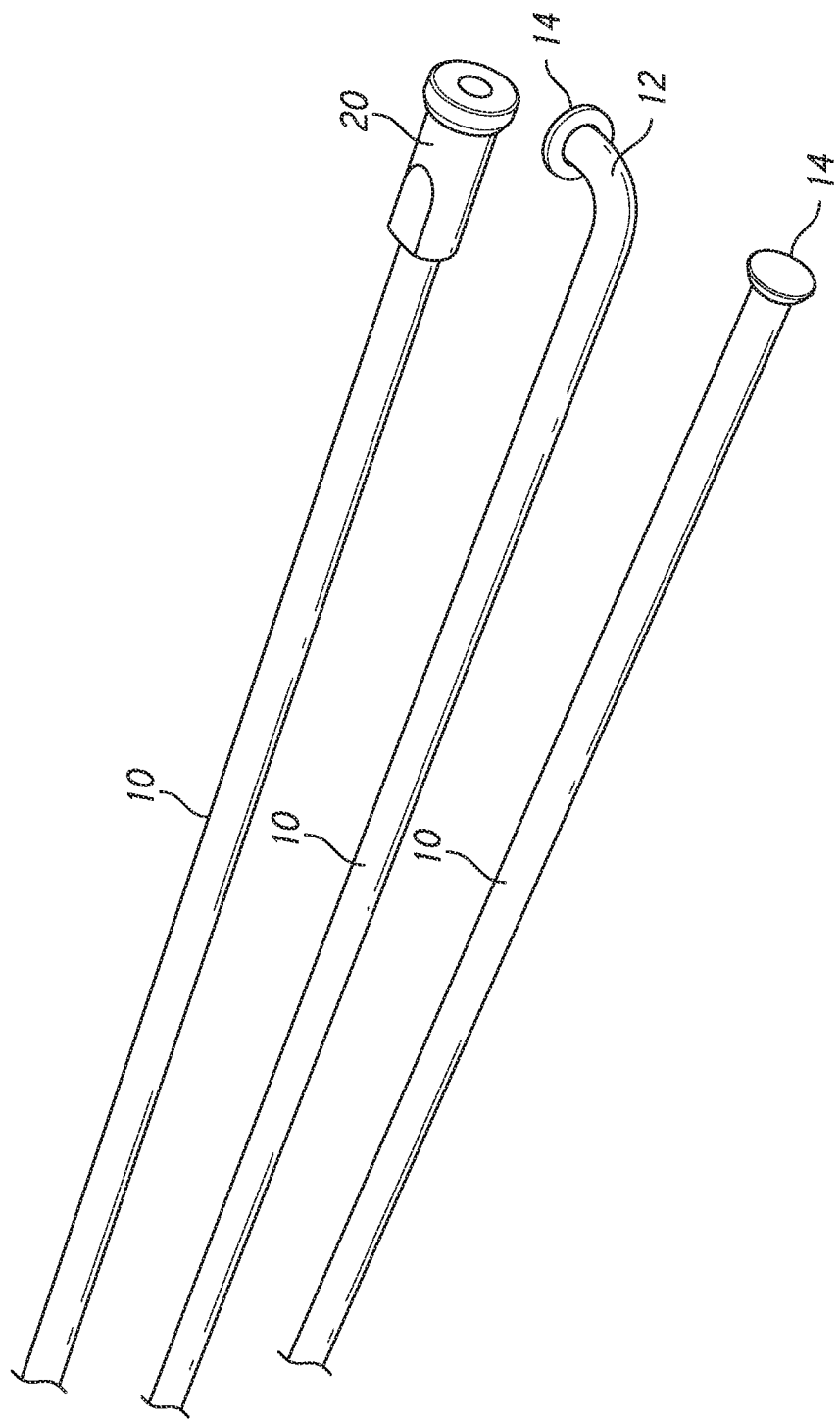
FIG. 3 is a perspective view, showing three standard end features for bicycle wheel spokes.

REFERENCE NUMERALS IN THE DRAWINGS 10 spoke
12 J-bend
14 head
16 threaded portion
18 rim
20 nipple
22 head
24 passage
26 grommet
28 flange
30 hub
32 hole
34 first crossing point
36 second crossing point
38 synthetic cable
40 anchor
41 potting cavity
42 rod segment
43 throat
44 rod end
46 jacket
48 potted region
50 potting transition
52 extended distal wall
54 cavity
56 opening
58 swaged interface
60 pointed rib
62 expanded portion
64 tapered portion
65 square rib
66 conical end portion
68 head
70 fillet
72 helical groove
74 thread
76 thickened wall section
78 expanded portion
80 neck portion
82 expanding entrance portion
84 first stage swage
86 second stage swage
88 rib
90 plastically deformed indentation
92 plastically deformed rib
94 coupler
96 extended proximal wall
98 first swaged interface
100 second swaged interface
102 male thread
104 female thread
106 coupler
108 passage
110 eye
112 cross piece
114 tapered expansion
116 yoke
118 pin
120 distal cylinder
122 circular swage
124 square swage
126 octagonal swage
128 cruciform swage
130 convoluted swage
132 internal swaging die
134 female thread
136 annular pocket
138 insert
140 protrusion
142 passage
144 insert
146 male thread
148 female thread
149 insert
150 insert
151 insert
152 insert
154 insert
156 insert
158 insert
160 insert
162 insert
164 annular relief
166 rod end attachment
168 rod end attachment
170 rod end attachment
172 rod end attachment
174 threaded engagement
176 rod end attachment
178 bulkhead
180 vent
182 wire rope
184 end fitting
186 coupler
188 steel stress-strain curve
190 synthetic loading curve
192 synthetic unloading curve.

DETAILED DESCRIPTION OF THE INVENTION

Figure 4:
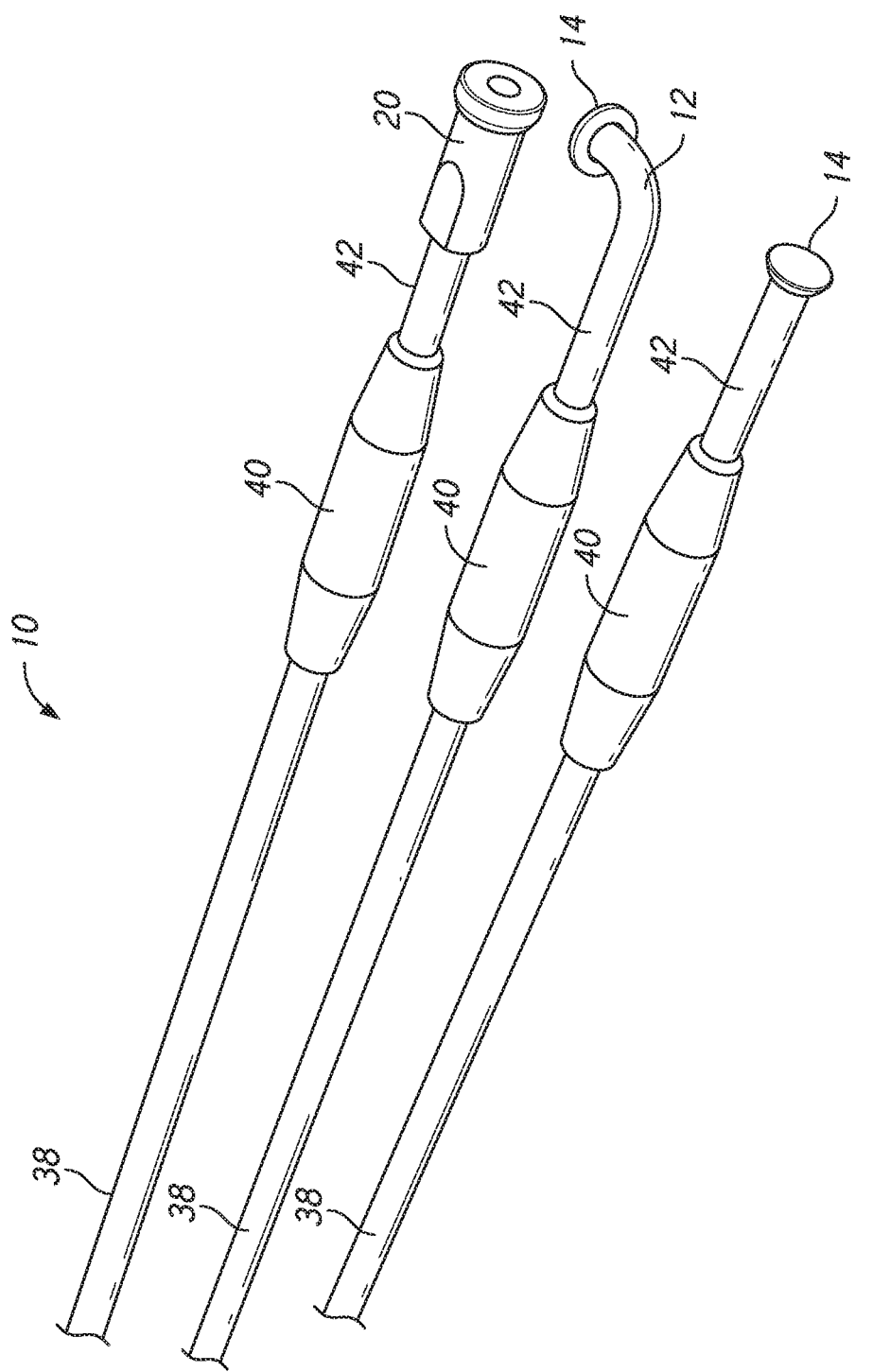
FIG. 4 is a perspective view, showing exemplary embodiments of the inventive hybrid tensile member assemblies with three standard end features for bicycle wheel spokes.

The basic concept of the present invention is to create a hybrid assembly including a flexible synthetic cable and one or more rod segments—wherein each rod segment has a standard end feature. In many examples a rod segment will be connected to both ends of the synthetic cable. This allows a synthetic cable to be retrofitted in many applications employing the standard end features. FIG. 4 shows three exemplary embodiments. In each of these, anchor 40 is used to connect a synthetic cable 38 to a rod segment 42. The rod segments include a standard end feature for load transfer—such as a threaded shaft connected to nipple 20, a J-bend 12 with expanded head 14, or a straight stem with expanded head 14.

Figure 7:
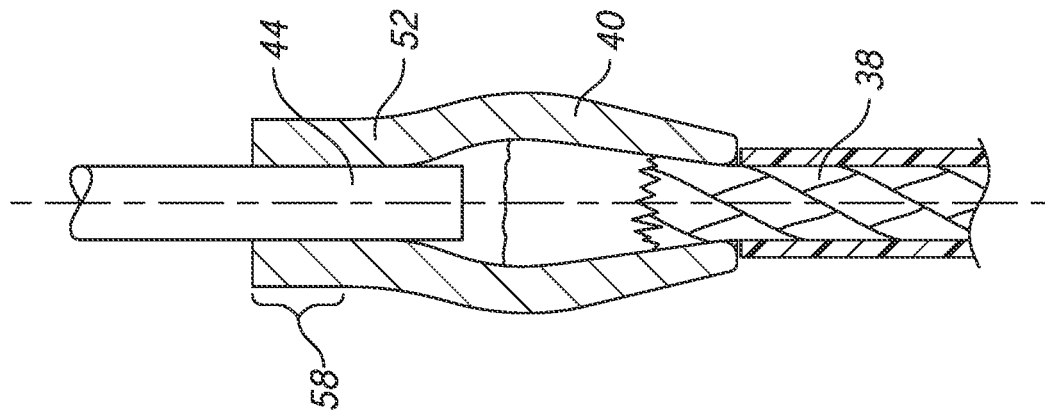
FIG. 7 is a sectional elevation view, showing the assembly of FIG. 6 after swaging.
Figure 6:
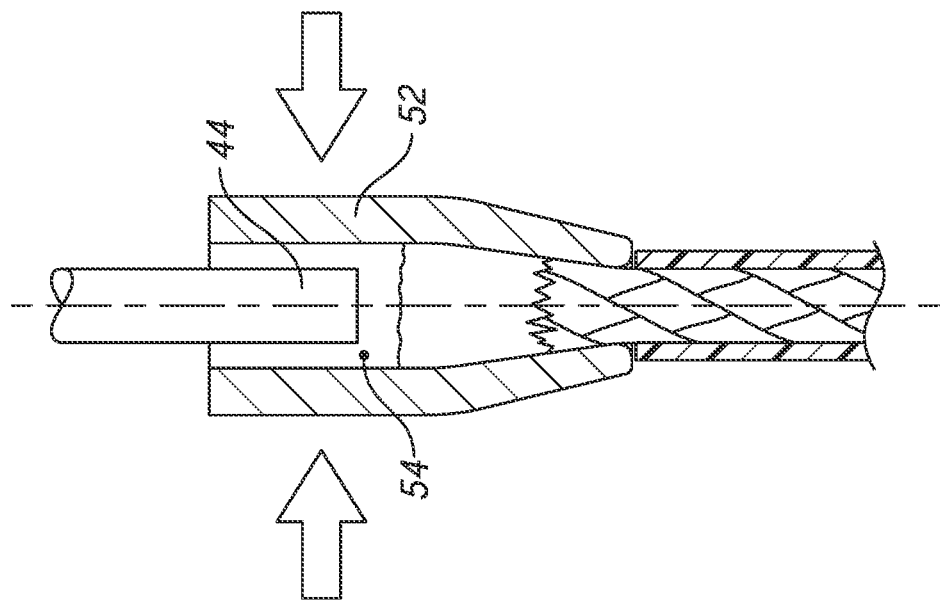
FIG. 6 is a sectional elevation view, showing the anchor of FIG. 5, with a rod end inserted prior to swaging.
Figure 5:
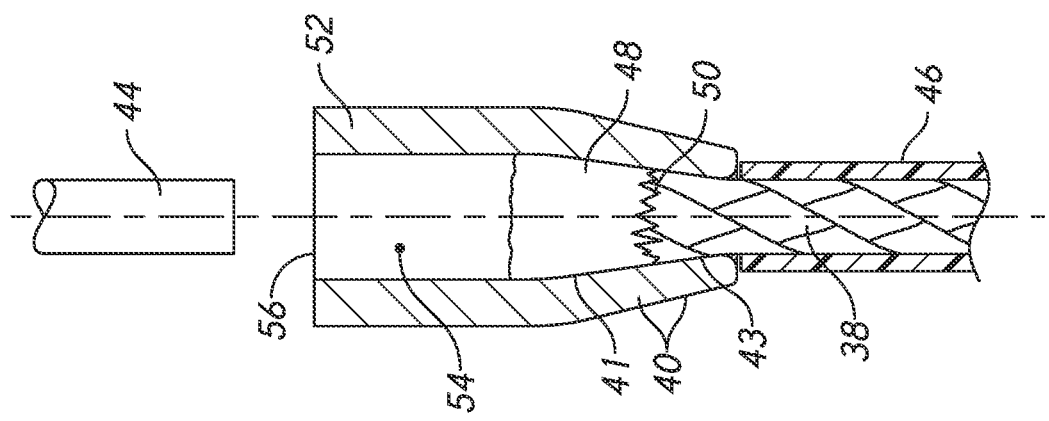
FIG. 5 is a sectional elevation view, showing an anchor connected to an end of a synthetic cable—prior to a swaging operation used to connect the anchor to a rod.

FIGS. 5-7 illustrate a first example of connecting the rod segment to a synthetic cable 38 which serves well to illustrate the challenges facing the present invention. Anchor 40 in this example is a radially symmetric metal piece, having a proximal region on the side of cable 38 (proximate throat 43) and a distal region on the opposite side (proximate opening 56). In the context of this disclosure, the proximal direction shall mean moving in the direction from opening 56 toward throat 43 and the distal direction shall mean moving in the direction from throat 43 toward opening 56. The proximal region of the anchor includes potting cavity 41. Cable 38 contains a large number of synthetic filaments (sometimes synonymously called fibers). These are usually contained within a surrounding polymer jacket 46. In this example, a length of the jacket is stripped away to reveal the filaments. The revealed length of filaments is placed within the potting cavity and splayed apart. This length is infused with liquid potting compound (before, during, or after being placed within the potting cavity) and maintained within the potting cavity as the potting compound transitions from a liquid to a solid. Once the potting compound has solidified, potted region 48 is a composite of synthetic filaments and potting compound. The expanding nature of the potting cavity mechanically locks the cable to the anchor, since potted region 48 is too large to pass through throat 43. Potting transition 50 is the transition region between the potted region—where the filaments are locked within the solidified potting compound—and the freely flexing portion of the cable. The potting transition is usually placed inside the anchor—though this need not always be the case.

As shown in FIG. 5, extended distal wall extends away from the potting cavity in the distal direction. Cavity 54 is located within the surrounding extended distal wall. Opening 56 leads from the exterior of the anchor to cavity 54. Rod end 44 is an end of the rod segment that is to be attached to the anchor. Rod end 44 is placed within cavity 54, as shown in FIG. 6. A swaging operation is then performed in order to plastically deform extended distal wall 54 inward against rod end 44. FIG. 7 shows the assembly after the swaging operation. The extended distal wall has been plastically deformed inward against rod end 44 to create swaged interface 58.

Swaging can assume many forms. In the example shown in FIG. 6, the swaging operation uses two dies squeezing inward as shown by the arrows. The swaging operation is repeated numerous times, with the swaging tool(s) being rotationally indexed about the anchor's central axis. In the result of FIG. 7, the reader will note that the extended distal wall has been thinned and elongated, in addition to being deformed inward (a common result of a swaging operation). The result is a very tight frictional fit between the inward-facing surfaces of extended distal wall 52 and the outward facing surfaces of rod end 44—along the length of swaged interface 58.

As those skilled in the art will know, swaged interface 58 can be made quite strong. The assembly thus created is subjected to tensile forces parallel to the central axis shown. These forces tend to pull the rod end free of the anchor. However, the swaged interface created is strong enough to withstand very large tensile forces. The swaged interface is designed to withstand far more pulling force than the assembly will be subjected to in service.

In looking at FIG. 5, the reader will readily appreciate that rod end 44 has a smaller diameter than cable 38, and that cable 38 has a smaller diameter than anchor 40. Potting cavity 41 must expand when proceeding in the distal direction within the anchor in order to create the desired mechanical interference when the potting process is complete. This expansion means that the overall diameter of the anchor must be significantly more than the diameter of the cable itself. Minimizing this overall diameter is an objective of the present invention. However, it is common for the cable to be 1.5 to 3.0 times the diameter of the rod end, and it is common for the anchor to be 2.0 to 3.0 times the diameter of the cable.

The differing diameters for the rod end and the anchor create challenges for the swaging process. The reader will note in FIG. 5 that rod end 44 is much smaller than opening 56 and cavity 54. Opening 56 and cavity 54 must generally be about the same diameter as the distal end of potting cavity 41. This fact means that the swaging operation must plastically deform extended distal wall 52 a considerable distance inward. FIG. 7 illustrates how far inward the deformation needs to be in order to create the desired swaged interface.

However, it is also important that the inward swaging forces not substantially deform anchor 40 in the vicinity of potted region 48. Inward deformation in this region can fracture the potted region 48—thereby significantly reducing the strength of the potted connection between the anchor and the cable. In order to avoid this phenomenon, the swaging operation is moved away from potted region 48 in the distal direction. The reader will note in FIG. 7 how swaged interface 58 is distal to the potted region. A suitable distal offset is provided in order to avoid damaging the potted region.

Swaging has many advantages in the creation of a mechanical connection. It is generally (1) inexpensive, (2) compact, (3) has no moving components, (4) has good fatigue resistance in tension, (5) adds no parts, and (6) is highly repeatable (consistent). Preferably the strength of the swaged interface is made equal to the break strength of the rod segment itself. In order to accomplish this objective, it is often desirable to provide grip-enhancing features within the swaged interface. Many different features can be added to the rod end and/or anchor to increase the strength of the swaged interface. FIGS. 8-9 shows a first example of this. Three pointed circumferential ribs 60 are added to rod end 44. FIG. 9 shows this assembly after rod end 44 has been placed in cavity 54 and a swaging operation carried out to create swaged interface 58. The reader will note how the material of extended distal wall 52 has been plastically deformed around pointed ribs 60. This deformation creates a mechanical interference in addition to frictional engagement in the swaged interface—resulting in a greater ultimate tensile strength. Many other alternative grip-enhancing features may be substituted.

Material selection for the components going into the swaged interface can be significant, and this is true for the example of FIGS. 8 and 9. Rod end 44 is made of steel, whereas anchor 40 is made of aluminum in this instance. An aluminum alloy is selected that can undergo plastic deformation without work hardening to the point of embrittlement. The aluminum alloy selected is able to deform to encompass the pointed ribs as shown in FIG. 9.

FIGS. 10 and 11 show a second type of exemplary feature added to rod end 44. The rod end includes expanded portion 62 and tapered portion 64. The tapered portion links the expanded portion to the normal diameter for the rod end. The expanded portion is placed within cavity 54 within anchor 40, and the swaging operation is then carried out. FIG. 11 shows the result. Extended distal wall 52 has been swaged inward to create swaged interface 58. A portion of the swaged interface lies over tapered portion 64—creating another mechanical interference in addition to the gripping force produced by the parallel surfaces within the swaged interface.

Figure 14:
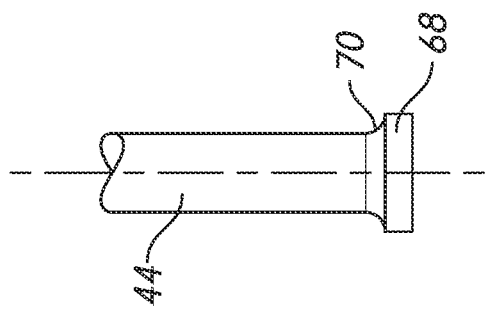
FIG. 14 is an elevation view, showing a rod end having an enlarged diameter proximate its end.
Figure 13:
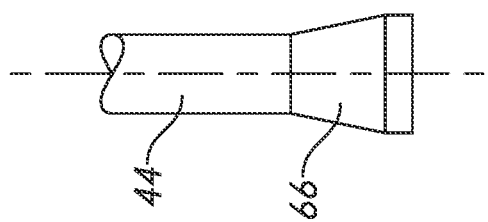
FIG. 13 is an elevation view, showing a rod end having an expanded portion with a tapered profile.
Figure 12:
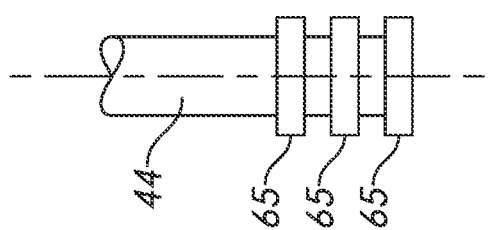
FIG. 12 is an elevation view, showing a rod end with three ribs having a square profile.

FIGS. 12-16 illustrate additional gripping features that can be added to rod end 44. FIG. 12 shows a rod end with the additional of three square ribs 65. FIG. 13 shows a rod end with the addition of conical end portion 66. FIG. 14 shows a rod end with the addition of an expanded head 68. Fillet 70 joins the expanded head to the normal rod end diameter.

Figure 16:
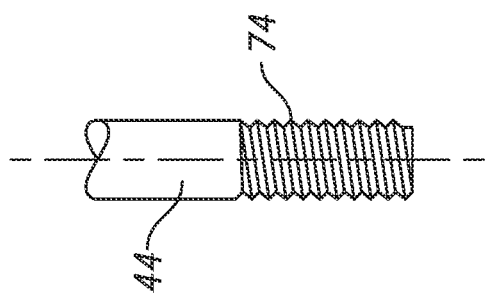
FIG. 16 is an elevation view, showing a rod end having a threaded portion.
Figure 15:
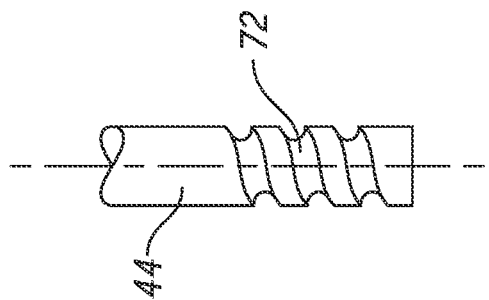
FIG. 15 is an elevation view, showing a rod end having a helical groove.

FIG. 15 shows a rod end with the addition of helical grove 72. FIG. 16 shows a rod end with the additional of a threaded portion 74. Those skilled in the art will realize that all these additional features are configured to add grip in the swaged interface. The grip-enhancing features can take on countless diverse shapes.

Figure 18:
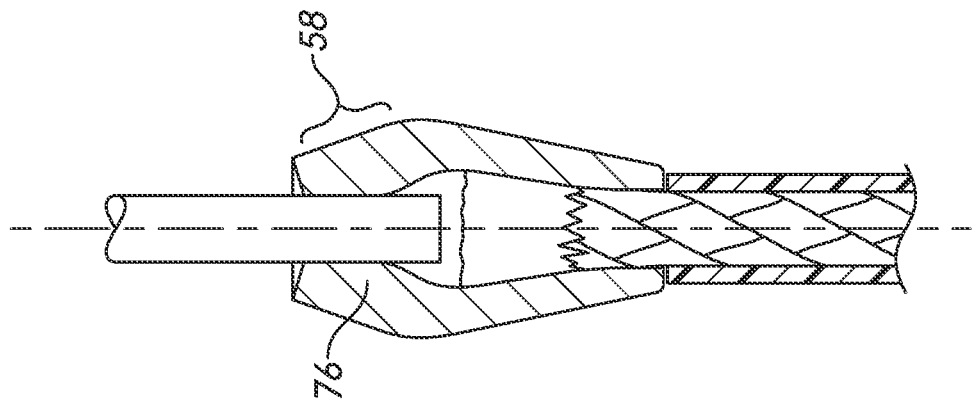
FIG. 18 is a sectional elevation view, showing the assembly of FIG. 17 after swaging.
Figure 17:
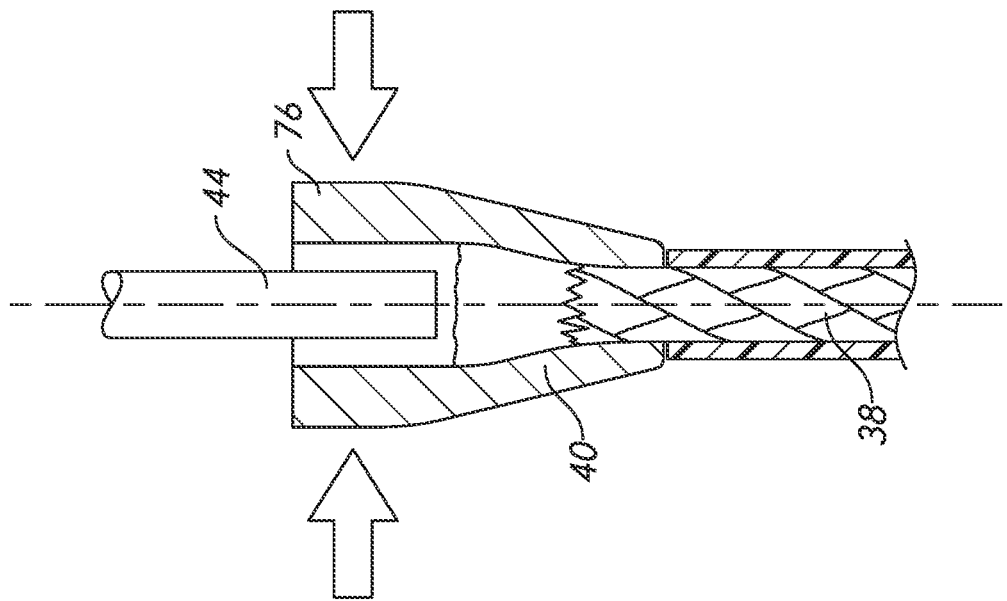
FIG. 17 is a sectional elevation view, showing an anchor having a varying wall profile and a rod end.
Figure 20:
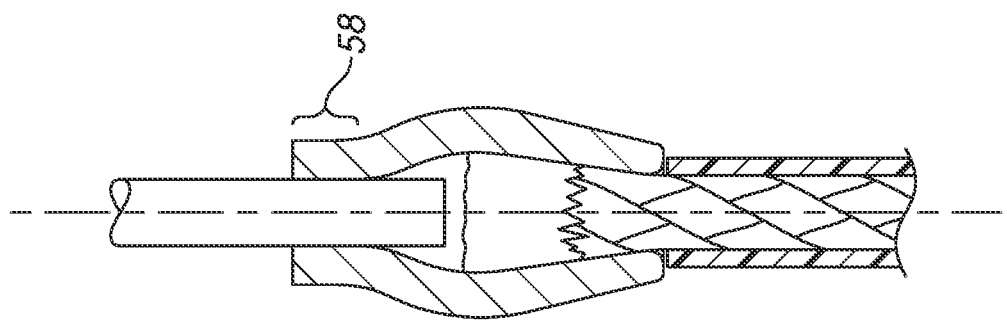
FIG. 20 is a sectional elevation view, showing the assembly of FIG. 19 after swaging.

FIGS. 17-22 illustrate exemplary features that can be added to extended distal wall 52 to vary the properties of the swaged interface. In the example of FIG. 17, the extended distal wall is provided with thickened wall section 76. This is particularly useful where the anchor is made of a ductile material—such as aluminum. The thickened wall section provides more material for deformation during the swaging process, as well as the potential for a stronger swaged interface. FIG. 18 shows this configuration after swaging. Swaged interface 58 includes a thicker wall section and enhanced strength. Additional swaging can be performed—relative to the state shown in FIG. 18—to extend the length of the swaged interface and thin the wall section in contact.

Figure 19:
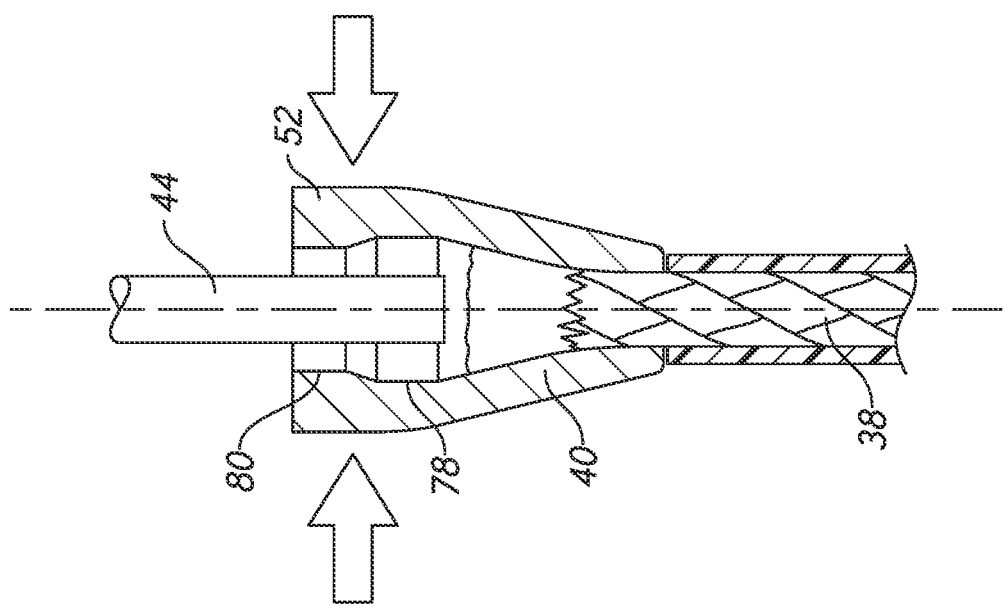
FIG. 19 is a sectional elevation view, showing an anchor having a varying wall profile and a rod end.

FIG. 19 shows another embodiment where neck portion 80 of the extended distal wall has a thicker section and expanded portion 78 does not. This configuration concentrates the force applied against rod end 44 during the swaging process—the force being concentrated at neck portion 80. Depending on the amount of swaging force used, this can plastically deform a portion of the rod end in addition to the extended distal wall.

Figure 22:
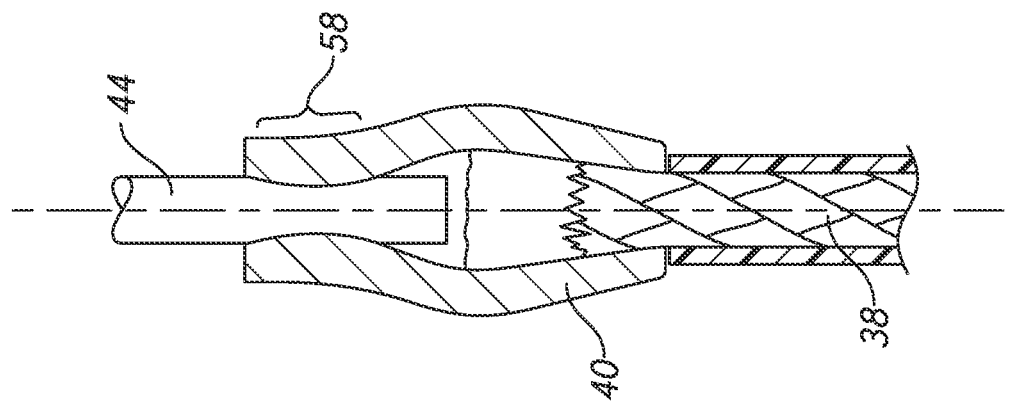
FIG. 22 is a sectional elevation view, showing the assembly of FIG. 21 after swaging.
Figure 21:
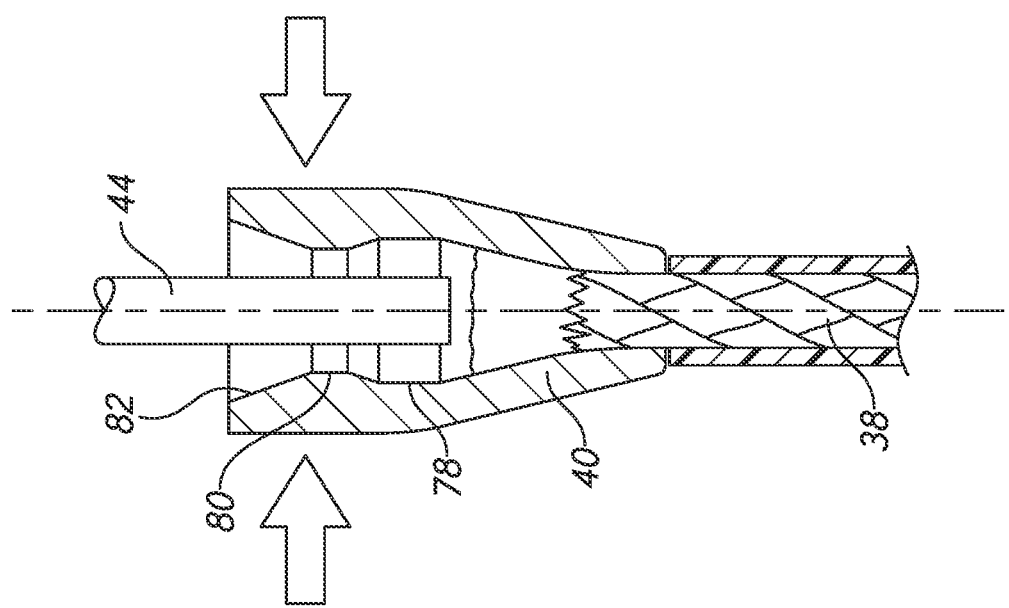
FIG. 21 is a sectional elevation view, showing an anchor having a varying wall profile and a rod end.

FIG. 21 shows an example where the extended distal wall is provided with an expanded portion 78, a neck portion 80, and an expanded entrance 82. In this example the anchor is made of a harder material. FIG. 22 shows the assembly after the swaging process. Neck portion 80 has been swaged laterally into the rod end material and has actually plastically deformed rod end 44 as shown. Swaged interface 58 therefore contains a mechanical interference as well as the frictional surface contact.

Figure 25:
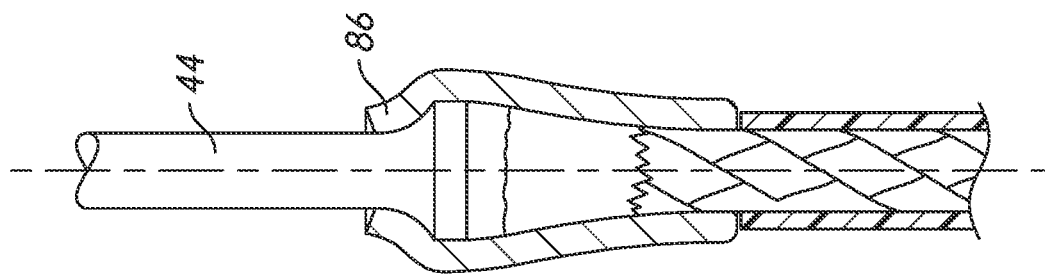
FIG. 25 is a sectional elevation view, showing a second step in the swaging of the assembly of FIG. 23.
Figure 24:
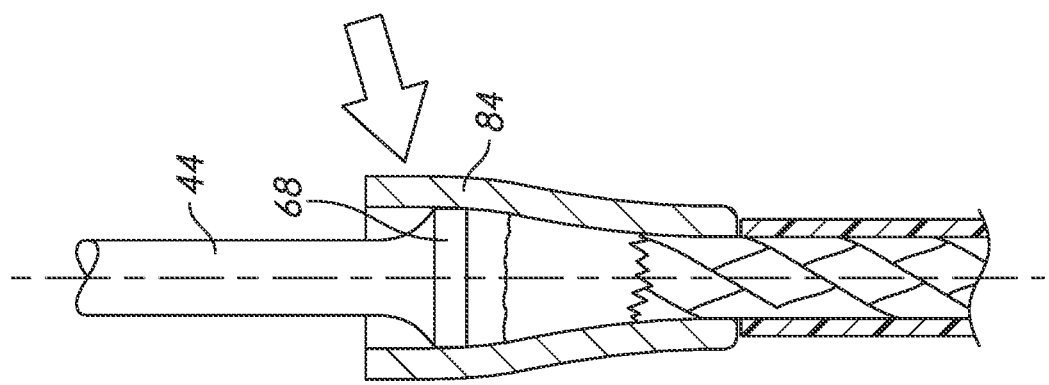
FIG. 24 is a sectional elevation view, showing a first step in the swaging of the assembly of FIG. 23.
Figure 23:
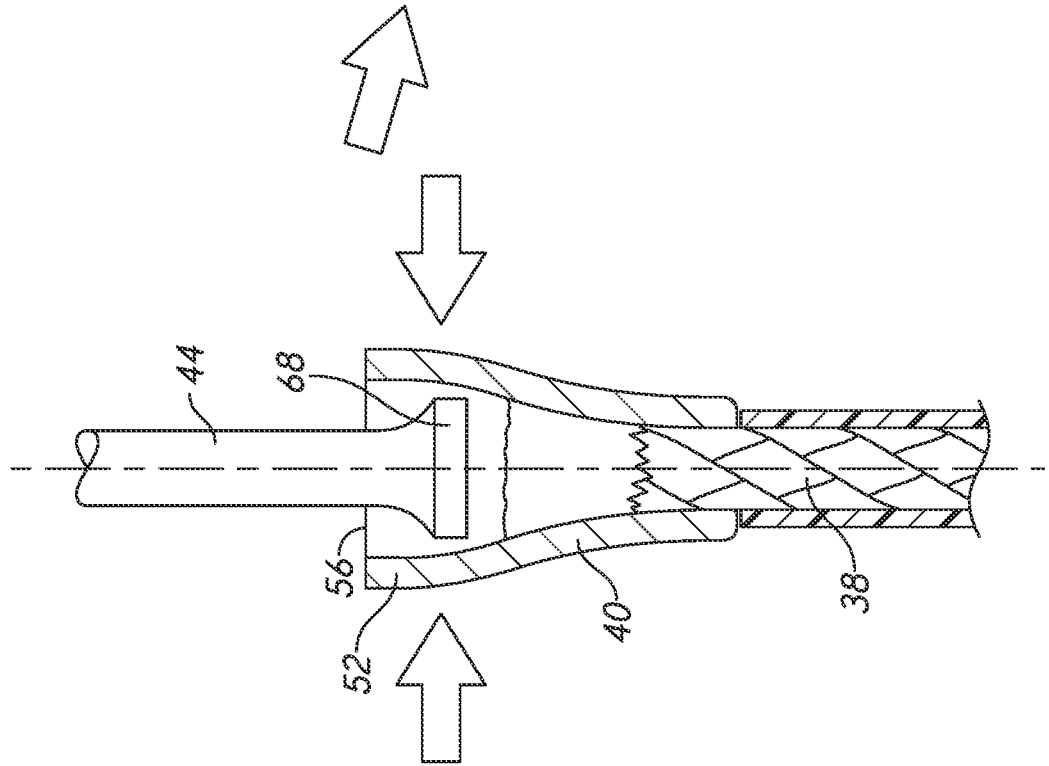
FIG. 23 is a sectional elevation view, showing an anchor and a rod end having an enlarged end portion.

FIG. 23 shows an example using a rod end 44 having an expanded head 68. Expanded head 68 is placed within the cavity inside extended distal wall 52. FIG. 24 shows the result of a first swaging operation in which first stage swage 84 deforms the extended distal wall inward against the perimeter of expanded head 68. FIG. 25 shows the result of a second swaging operation in which second stage swage deforms the free end of the extended distal wall over the distal side of head 68 in order to create a significant mechanical interference in the joint. FIGS. 23-25 illustrate the advantages of multiple swaging operations in some instances. Two different sets of swaging dies can be used for these operations.

Figure 27:
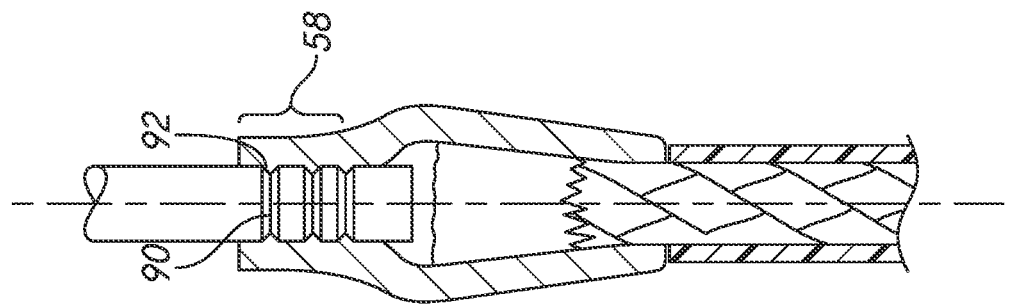
FIG. 27 is a sectional elevation view, showing the assembly of FIG. 26 after swaging.
Figure 26:
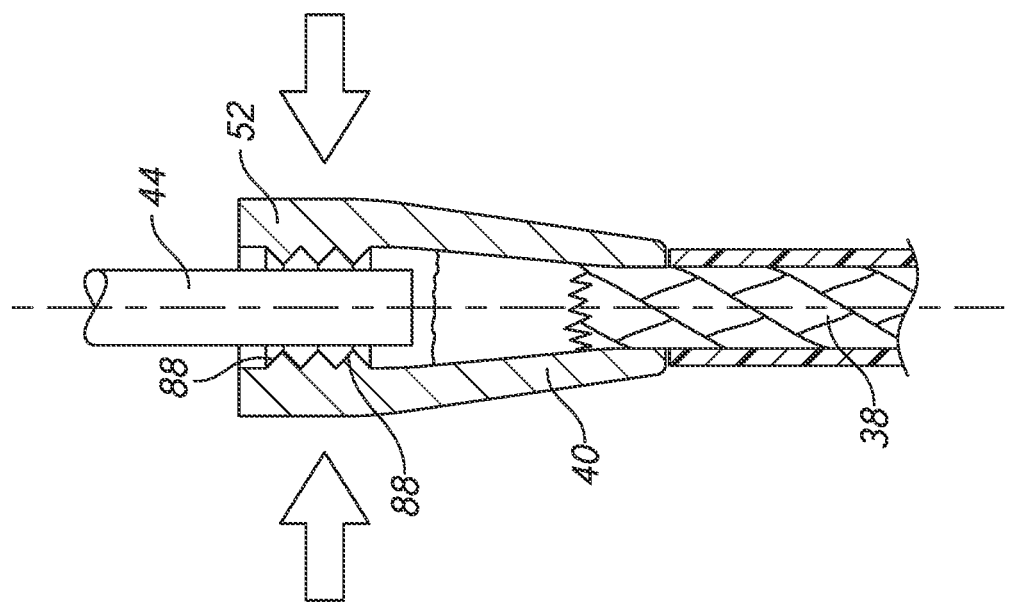
FIG. 26 is a sectional elevation view, showing an assembly of an anchor having internal ribs and a rod end.

FIG. 26 shows an exemplary anchor 40 where ribs 88 have been added to the inward facing wall of extended distal wall 52. FIG. 27 shows the result of a swaging operation. In this case the anchor and the rod end are made of comparable materials. Plastic deformation of both the extended distal wall and the rod end results in this case. Ribs 88 are reduced in size and thickness—resulting in plastically deformed ribs 92. The previously smooth exterior of rod end 44 is likewise deformed into plastically deformed indentations 90. A mechanical interference between the ribs and the indentations—each of which have been work hardened—is thereby created in swaged interface 58.

Figure 28:
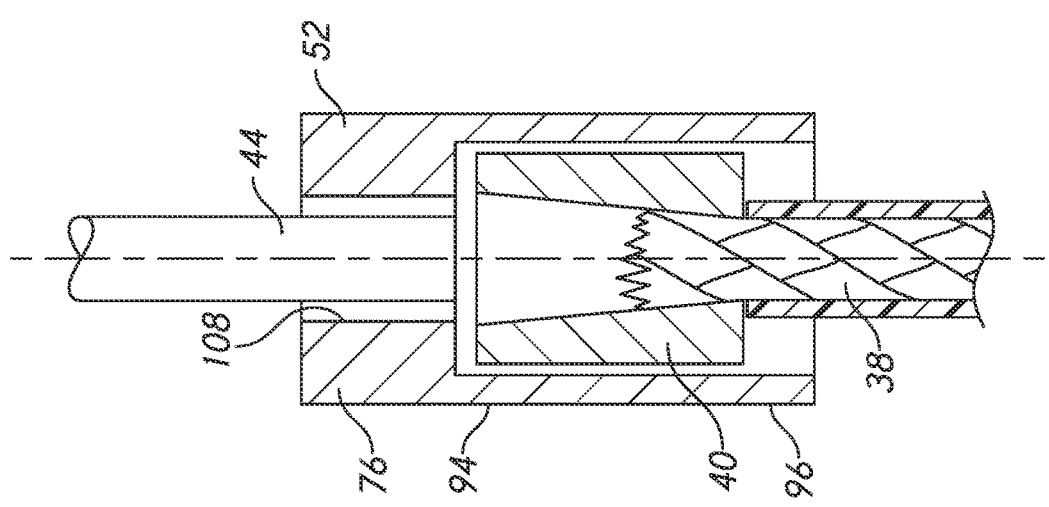
FIG. 28 is a sectional elevation view, showing an anchor, a coupler, and a rod end.

In some embodiments the anchor can be made in multiple pieces. FIGS. 28-32 illustrate this option. FIG. 28 shows an anchor 40 attached to cable 38 (In this example the attachment is made by potting). This particular anchor does not have an extended distal wall. Instead, the extended distal wall is provided on coupler 94. The coupler 94 slides over anchor 40. Extended distal wall 52 extends in the distal direction and extended proximal wall 96 extends in the proximal direction. In this particular example, the extended distal wall includes a thickened wall section 76, including a passage 108. The passage is in effect a cavity within the extended distal wall, and rod end 44 is placed in this cavity.

Figure 30:
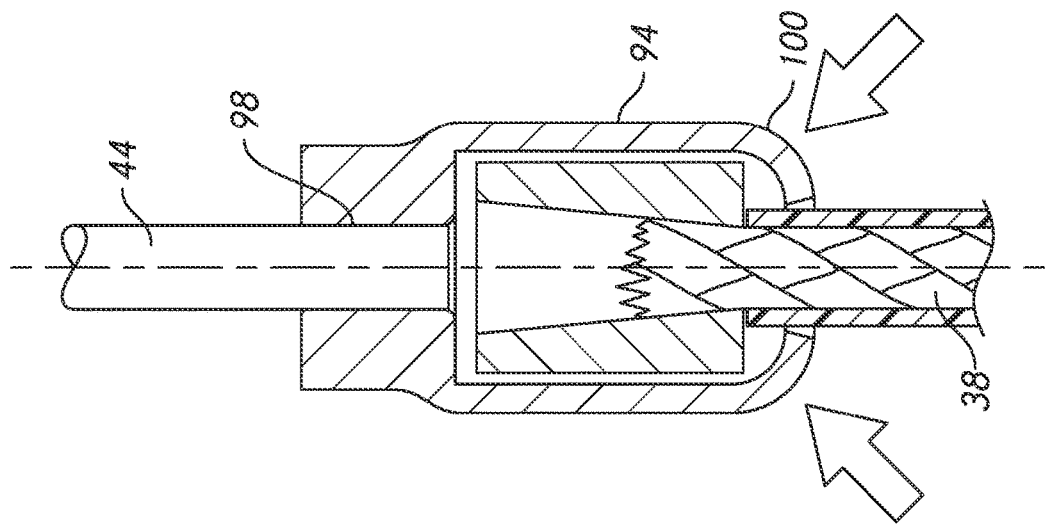
FIG. 30 is a sectional elevation view, showing a second step in the swaging of the assembly of FIG. 28.
Figure 29:
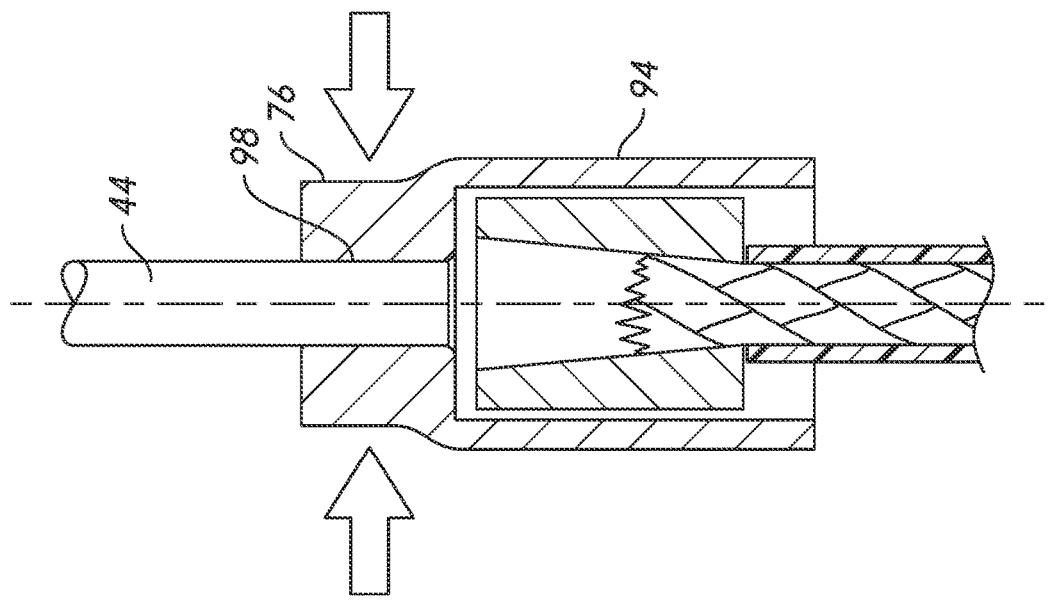
FIG. 29 is a sectional elevation view, showing a first step in the swaging of the assembly of FIG. 28.

FIG. 29 shows a first swaging operation carried out on the extended distal wall—resulting in the creation of first swaged interface 98. At this point coupler 94 is connected to rod end 44—but the coupler is not connected to the anchor. FIG. 30 shows the result of a second swaging operation in which extended proximal wall 96 is swaged inward over the proximal end of the anchor to create second swaged interface 100. The result of the two swaging operations is that rod end 44, coupler 94, anchor 40, and cable 38 are all connected together so that a ensile load can be transmitted through the assembly.

Figure 32:
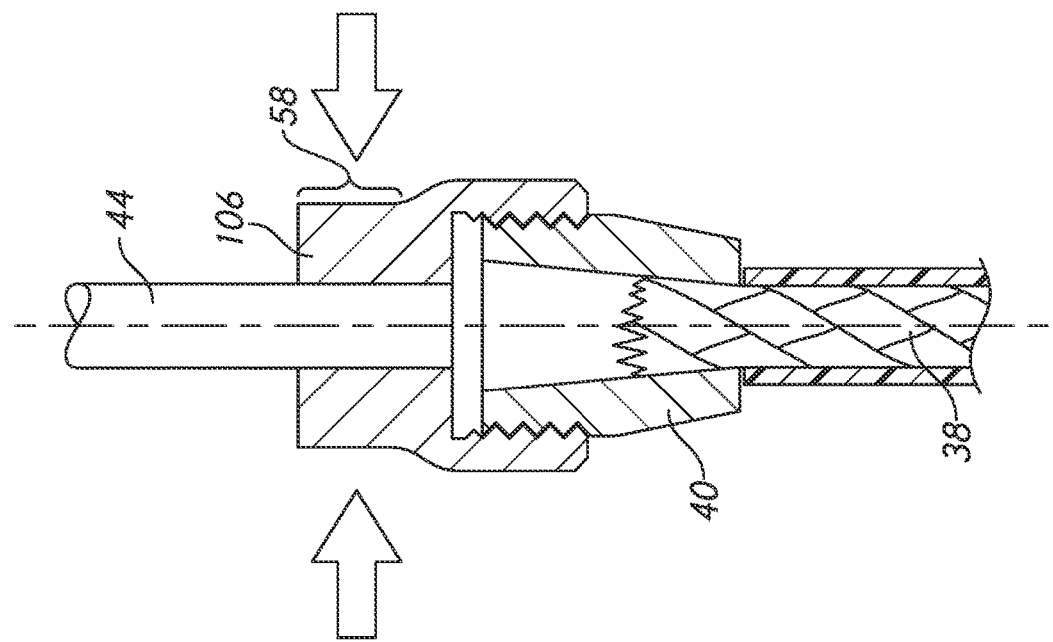
FIG. 32 is a sectional elevation view, showing the assembly of FIG. 31 after swaging.
Figure 31:
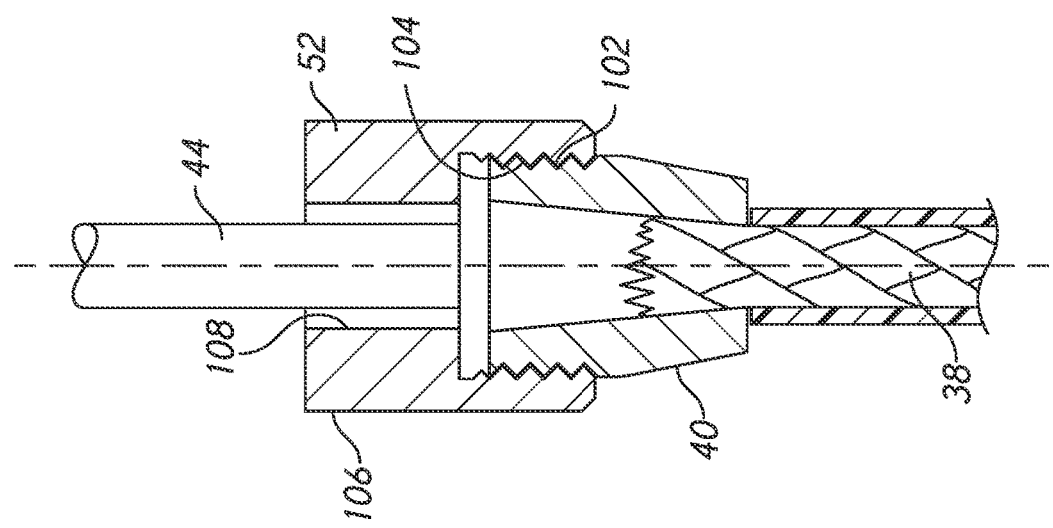
FIG. 31 is a sectional elevation view, showing a threaded anchor, a threaded coupler, and a rod end.

FIGS. 31-32 show an additional embodiment in which swaging is used to connect a rod end to a coupler but a threaded interface is used to connect the coupler to the anchor. In FIG. 31, the reader will note that anchor 40 includes a male thread 102 on its distal end. Coupler 106 includes a female thread 104 sized to engage male thread 102 and thereby attach coupler 106 to anchor 40. As for the prior example, coupler 106 includes a passage 108 sized to receive rod end 44. A swaging operation is performed on the extended distal wall 52 of the coupler—as shown in FIG. 32—thereby creating swaged interface 58. The result is that rod end 44 is connected to coupler 106, coupler 106 is connected to anchor 40, and anchor 40 is connected to cable 38.

Each of the rod segments illustrated has a first rod end and a second rod end. The rod end 44 in each of the illustrations has been the first rod end of a rod segment. The second rod end of each such rod segment is provided with a standard end feature—meaning an end feature configured to interface with known connection methods. FIGS. 33 and 34 provide a non-exhaustive listing of these standard end features.

Figure 33E:
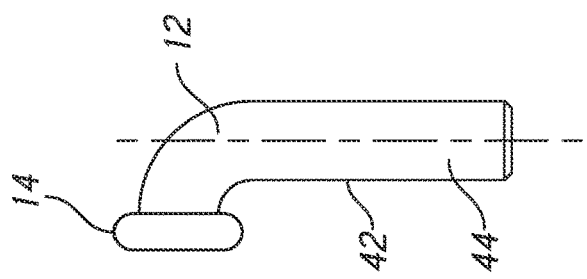
FIG. 33E is an elevation view, showing a rod segment with a J-bend and a head.
Figure 33D:
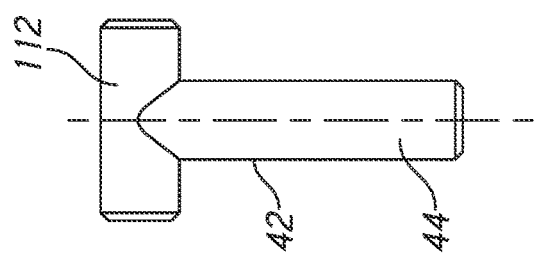
FIG. 33D is an elevation view, showing a rod segment with a cross piece.
Figure 33C:
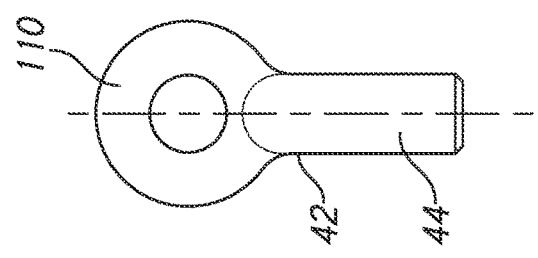
FIG. 33C is an elevation view, showing a rod segment with an eye.
Figure 33B:
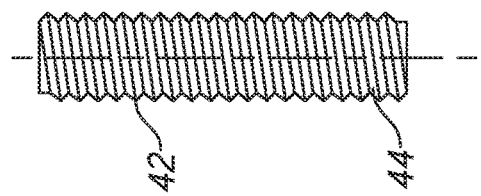
FIG. 33B is an elevation view, showing a threaded rod segment.
Figure 33A:
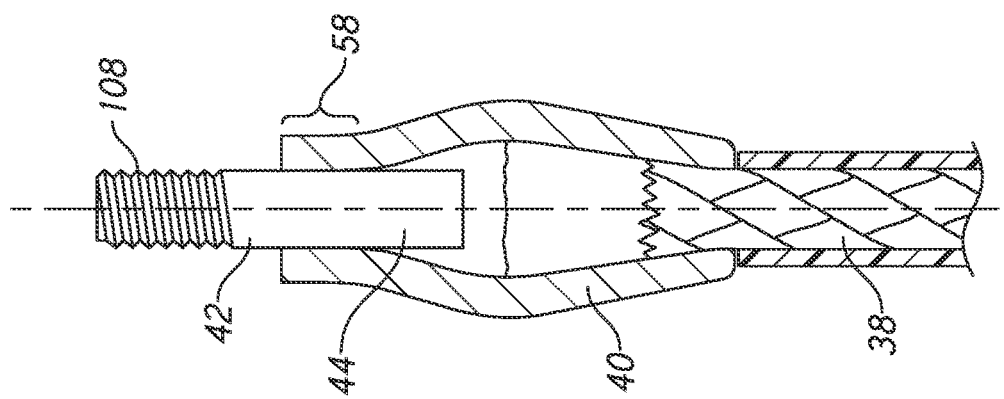
FIG. 33A is an elevation view, showing a swaged assembly and alternate rod end features.

FIG. 33A depicts an anchor that is swaged to a rod segment 42. The first rod end 44 of the rod segment 42 shown is swaged into the anchor's extended distal wall to form swaged interface 58. The second rod end of the rod segment is provided with a standard end feature—in this case male thread 108. Male thread 108 can be used to connect the rod segment to a nipple on a bicycle wheel rim or to any other structure having a suitable female thread.

FIG. 33B depicts a rod segment 42 having a male thread 108 along its entire length—including both rod ends. The thread on rod end 44 provides a grip-enhancing interface for the swaging operation, whereas the thread on the opposite end provides a standard end feature that is useful for connections. FIG. 33C depicts a rod segment 42 having a loading eye 110 on its second rod end. FIG. 33D depicts a rod segment having a cross piece 112 on its second rod end. FIG. 33E depicts a rod segment having a J-bend 12 and an expanded head 14 on its second rod end. All these structures are standard end features that can be used to attach the rod segment to other structures.

FIG. 34 shows still more exemplary standard end features. FIG. 34A depicts a rod segment having tapered end 114 on its second rod end. FIG. 34B depicts a rod segment having an expanded head 14 on its second rod end. FIG. 34C depicts a rod segment having a yoke and removable transverse pin 118 on its second rod end. FIG. 34D depicts a rod segment having a distal cylinder 120 on its second rod end. The distal cylinder can be used for connection—such as by a swaging operation connecting the distal cylinder to an external structure.

FIG. 35 depicts several different kinds of swages. FIG. 35A depicts an anchor 40 with its extended distal wall swaged to rod end 44. A section view "callout" is provided through swaged interface 58. The views in FIGS. 35B-35F depict cross sections corresponding to this callout.

Figure 35F:
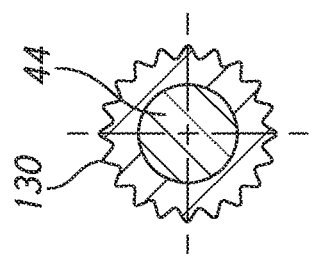
FIG. 35F is a sectional view, showing a convoluted swage.
Figure 35E:
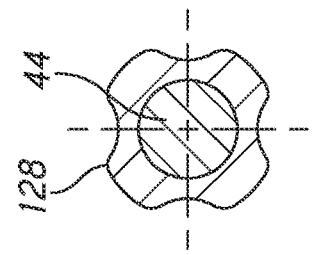
FIG. 35E is a sectional view, showing a cruciform swage.
Figure 35D:
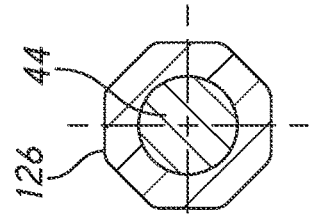
FIG. 35D is a sectional view, showing an octagonal swage.
Figure 35C:
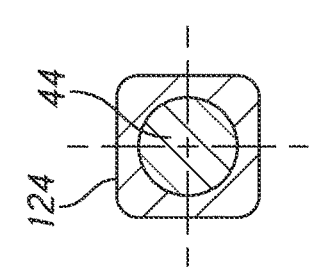
FIG. 35A is a sectional elevation view, showing an alternate swaging profile.
FIG. 35B is a sectional view, showing a circular swage.
Figure 35B:
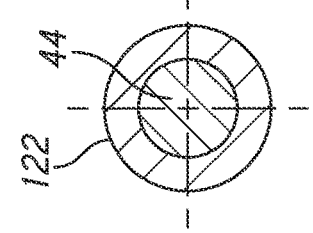
Figure 35A:
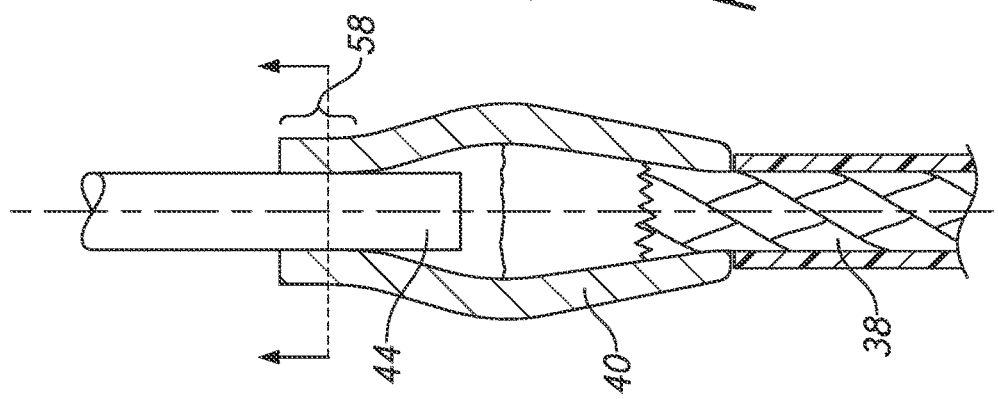

FIG. 35B shows a circular swage 122 of the extended distal wall over rod end 44. FIG. 35C shows a square swage 124 over rod end 44. FIG. 35D shows an octagonal swage 126 over rod end 44. FIG. 35E shows a cruciform swage 128 over rod end 44. Finally, FIG. 35F shows a convoluted swage 130 over rod end 44. Differing swaging dies can be used to create all these swaged cross sections (and many more).

Figure 38:
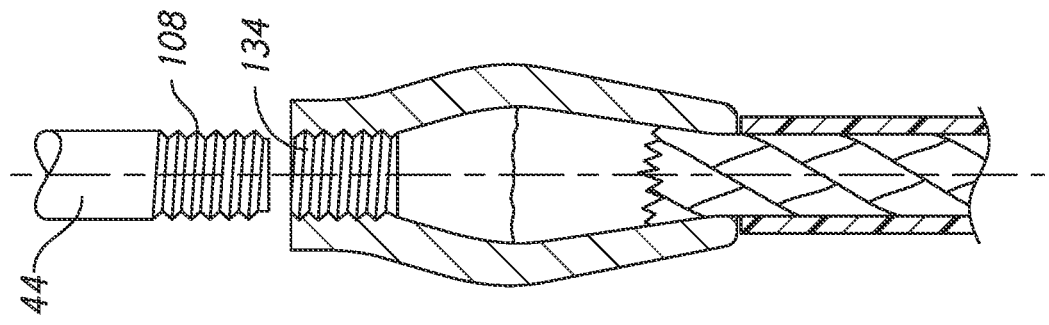
FIG. 38 is a sectional elevation view, showing a swaged anchor after threading with the addition of a threaded rod end.
Figure 37:
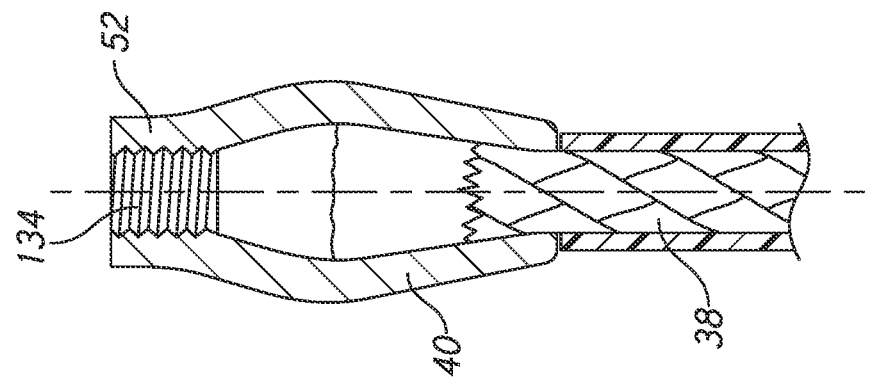
FIG. 37 is a sectional elevation view, showing a swaged anchor after threading.
Figure 36:
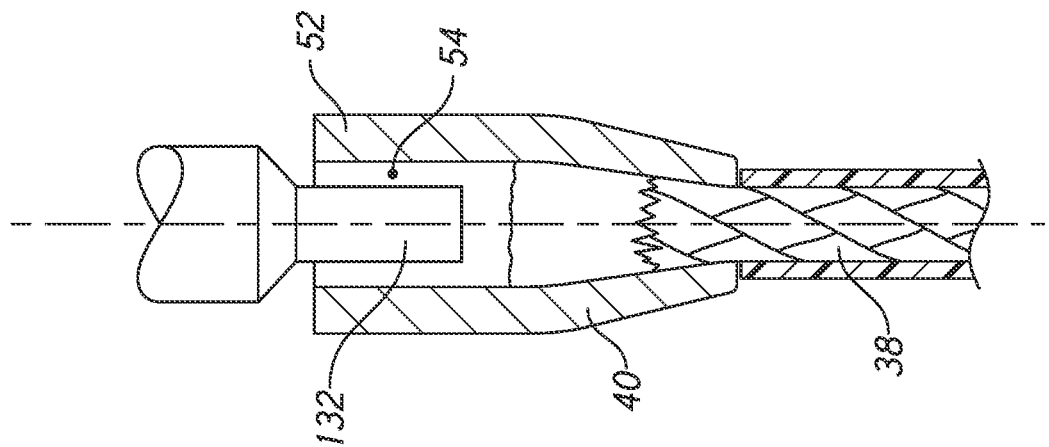
FIG. 36 is a sectional elevation view, showing the use of a removable internal tool for the swaging operation.
Figure 44D:
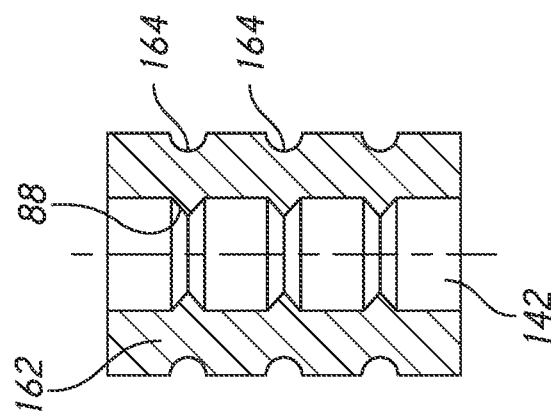
FIG. 44D is a sectional elevation view, showing a swaging insert.
Figure 44C:
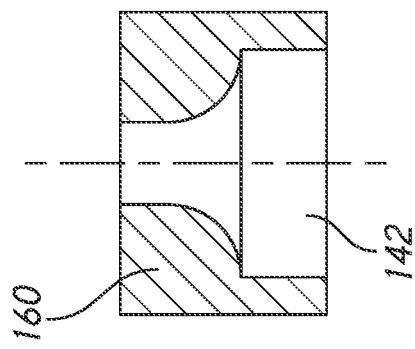
FIG. 44C is a sectional elevation view, showing a swaging insert.
Figure 44B:
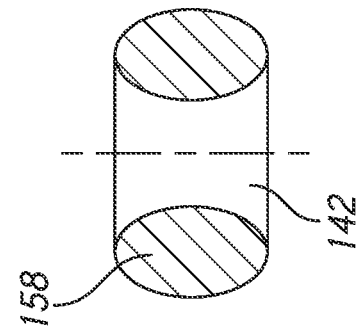
FIG. 44B is a sectional elevation view, showing a swaging insert.
Figure 44A:
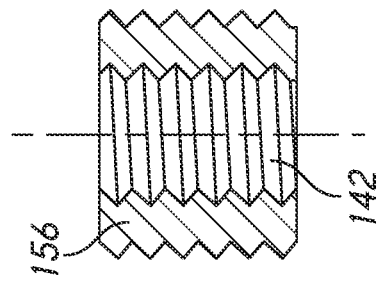
FIG. 44A is a sectional elevation view, showing a swaging insert.

In the preceding examples the swaging operation forced part of the anchor against part of a rod segment. It is also possible to use a separate swaging die in the place of the rod segment. FIGS. 36-38 illustrate this approach. In FIG. 36 a male swaging die is inserted into cavity 54 on the distal end of anchor 40. FIG. 37 shows extended distal wall 52 after it has been swaged to swaging die 132 and after the swaging die has been removed by pulling it in the distal direction. Female thread 134 has also been added to the swaged interior profile of extended distal wall 52—typically by using a threading die. In FIG. 38, a rod end 44 having a male thread 108 is threaded into female thread 134 in the distal end of the anchor. Rod end 44 is thereby secured to anchor 40. Swaging is thus (in this example) part of the process for connecting rod end 44 to anchor 40. However, the swaging operation did not directly connect the anchor to the rod end.

In a variation on what is illustrated in FIG. 36, it is possible to apply a swaging operation to the extended distal wall without the presence of swaging die 132. In this variation the extended distal wall is still swaged inward—but no internal male die is used. The result is a reduced-diameter entrance with a somewhat irregular perimeter. A hole is then drilled or reamed in the reduced diameter resulting from the swage. A female thread is then cut in the hole after the drilling and/or reaming operation. Male thread 108 is then provided on rod end 44 and the interface between threads 108,134 is used to connect the rod end. This is a useful process for adding a rod segment to a hybrid assembly on the end that is nearest the hub.

In still other exemplary embodiments it is helpful to provide an additional component that will become part of the actual swaged interface. This component is generally referred to as an "insert." FIG. 39 shows a first example. As discussed previously, the diameter of rod end 44 is often much less than the diameter of the cavity inside extended distal wall 52. The significant difference in diameters means that the swaging operation has to deform the extended distal wall a good distance inward. An insert is used to "bridge" this difference in diameters. Extended distal wall 52 of anchor 40 in this example includes annular pocket 136. Insert 138 is also provided. The insert has a passage 142 sized to receive rod end 44. The insert also has a protrusion 140 sized to fit within annular pocket 136. Rod end 44 is placed through passage 142 and protrusion 140 is aligned with annular pocket 136. A swaging operation is then performed to deform the extended distal wall inward against the insert.

FIG. 40 shows the result. Extended distal wall 52 has been plastically deformed inward to press insert 138 against rod end 44 and create an altered swaged interface. Material selection can alter the characteristics of the swaged interface, and the presence of an insert allows additional flexibility. In the example of FIGS. 39 and 40, the rod end and the insert are made of steel. Anchor 40 is made of a more ductile material—such as aluminum. Passage 142 can also be provided with grip-enhancing surface features like ribs, threads, or simply a rough surface. These features enhance the grip between the rod end and the insert when the swaging operation is performed.

FIG. 41 shows a second type of exemplary insert. Insert 144 again contains a passage 142 sized to admit rod end 44. However, the exterior of the insert is provided with male thread 146. The inward facing side of extended distal wall 52 is provided with a female thread. Rod end 44 is inserted through passage 142 in insert 144 and the insert—with the rod end in tow—is threaded into female thread 146. After the insert is in position, a swaging operation is performed to deform the extended distal wall inward. FIG. 42 shows the result. Swaged interface 58 is created over the length of the insert 144 and an additional length in the distal direction where the extended distal wall is actually deformed inward over the distal end of the insert.

FIG. 43 shows additional exemplary inserts. In FIG. 43A, insert 149 has a tapered exterior wall. Insert 151 in FIG. 43B has a curved exterior wall. Insert 150 in FIG. 43C has a more complex passage 142—including a straight portion and a tapered portion. Insert 152 in FIG. 43D has a passage 142 including a straight portion and a second portion with a curved side wall. Insert 154 in FIG. 43E has a passage with a straight portion and a tapered portion, as well as an exterior wall that incorporates a taper.

FIG. 44 shows still more exemplary swaging inserts. Insert 156 in FIG. 44A includes an internal thread and an external thread. Insert 158 in FIG. 44B uses a curved wall for passage 142 and a curved exterior wall. Insert 160 in FIG. 44C includes an internal passage 142 configured to receive a rod end having an expanded head. Insert 162 in FIG. 44D includes a series of ribs 88 on its internal passage and a series of annular reliefs 164 on its external wall.

Figure 45D:
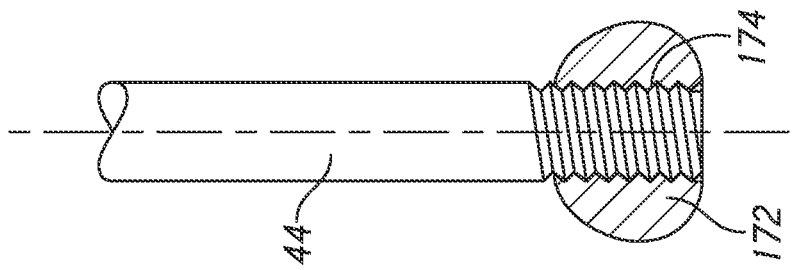
FIG. 45D is a sectional elevation view, showing a rod end attachment.
Figure 45C:
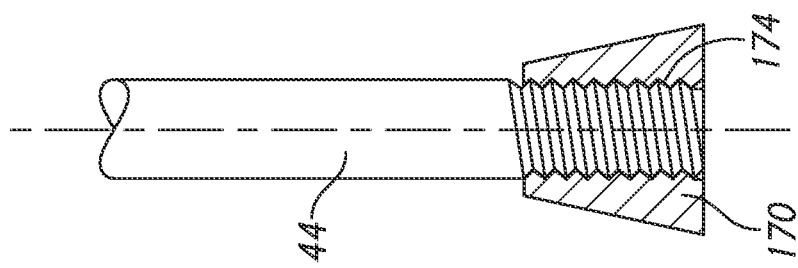
FIG. 45C is a sectional elevation view, showing a rod end attachment.
Figure 45B:
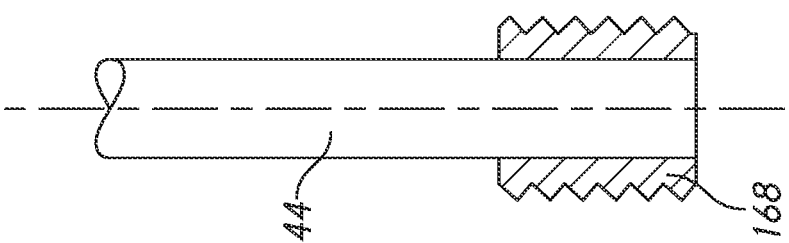
FIG. 45B is a sectional elevation view, showing a rod end attachment.
Figure 45A:
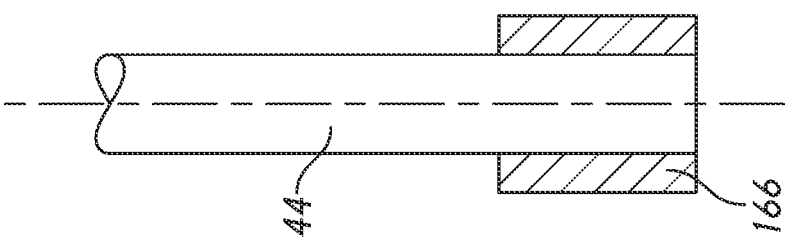
FIG. 45A is a sectional elevation view, showing a rod end attachment.

Another form of swaging insert can be attached to the rod end prior to insertion into the anchor cavity. FIG. 45 shows this. Rod end attachment 166 in FIG. 45A is a steel sleeve that is pressed onto the end of rod end 44 to create in effect an expanded portion. The rod end—along with rod end attachment 166—is then swaged to the anchor. Rod end attachment 168 in FIG. 45B is also pressed onto the end of rod end 44. This attachment includes an external thread. Press fitting is only one method of attaching the rod end attachment to the rod. The attachment could also be swaged, glued, welded, threaded, or brazed in position. Rod end attachment 170 in FIG. 45C is threaded into place on the rod end. This attachment includes a tapered external surface. Rod end attachment 172 in FIG. 45D is also threaded in place. This attachment includes a spherical outer surface.

Returning briefly to the embodiment of FIG. 5, the reader will recall that in many (though not all) cases anchor 40 will be attached to cable 38 by the creation of potted region 48. The effect of the swaging operation on the potted region is a design consideration. In looking at FIG. 6, those skilled in the art will realize that if the swaging forces are applied too far in the proximal direction they may deform the wall surrounding potted region 48 and thereby possibly reduce the strength of the potted connection. In some embodiments it is desirable to add features that guard against the unwanted deformation in the vicinity of the potted region.

Figure 47:
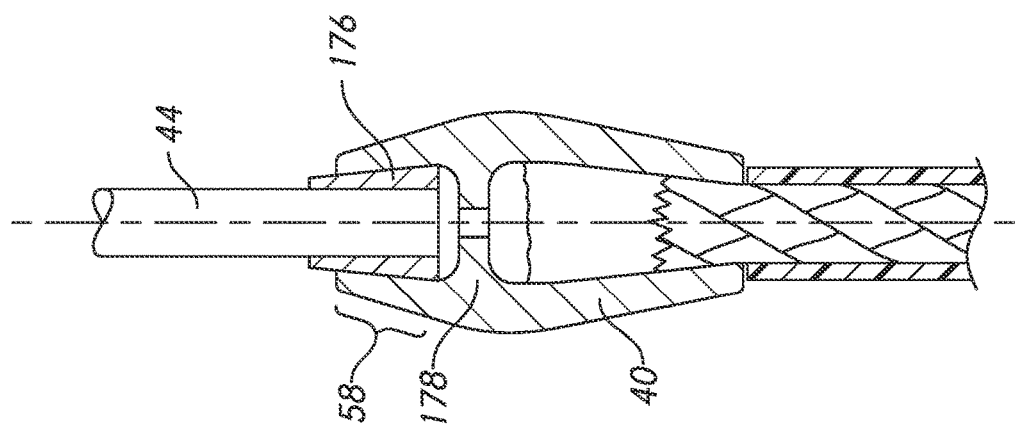
FIG. 47 is a sectional elevation view, showing the assembly of FIG. 46 after swaging.
Figure 46:
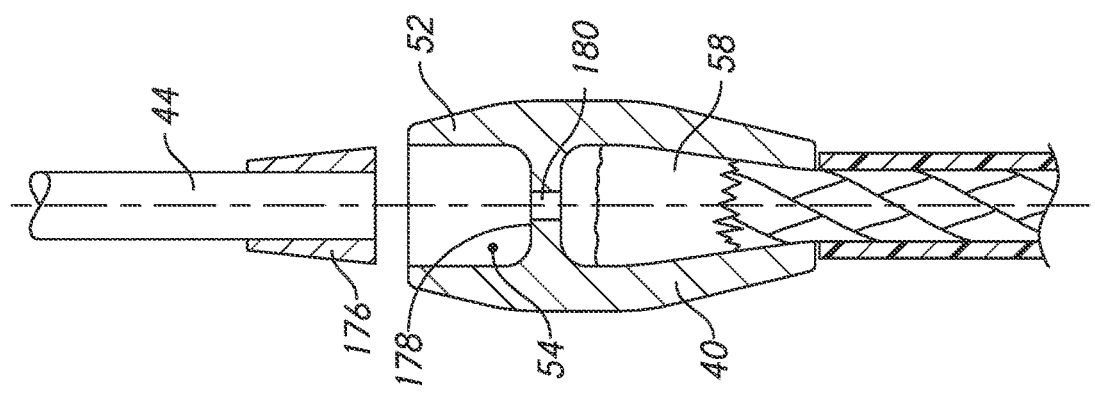
FIG. 46 is a sectional elevation view, showing an anchor incorporating a transverse bulkhead.

FIG. 46 shows anchor with an additional transverse bulkhead 178 added proximate the distal side of potted region 48. Bulkhead 178 in this example includes a vent 180. Additional vents may be provided—including vents through extended distal wall 52—in order to allow the escape of air trapped during the swaging or potting processes. Rod end attachment 176 is provided on rod end 44. The rod end and its attachment are then placed inside cavity 54. A swaging operation is then performed to deflect extended distal wall 52 inward. FIG. 47 shows the result. Swaged interface 58 is limited to the region distal to bulkhead 178. The presence of the bulkhead limits any unwanted compression on the potted region.

Of course, bulkhead 178 may not be provided solely to protect the potted region. The presence of the bulkhead also tends to modify the shape of the resulting swage interface, since little inward compression is possible in the vicinity of the bulkhead. In the example of FIG. 47, the bulkhead has assisted in the creation of a conical shape for the swaged interface. The bulkhead may be added for other reasons as well—such as aiding in the manufacturing process for the anchor.

Figure 49:
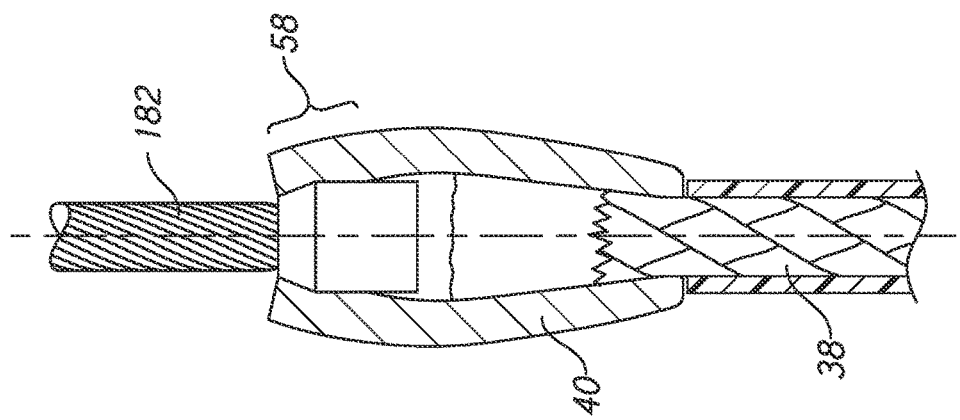
FIG. 49 is a sectional elevation view, showing the assembly of FIG. 48 after swaging.
Figure 48:
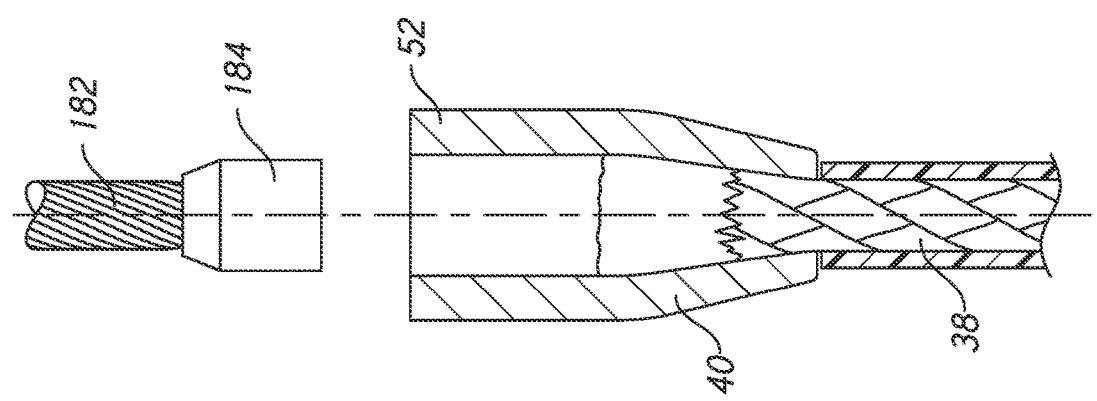
FIG. 48 is a sectional elevation view, showing the use of a swaged connection to connect to a wire rope.

FIGS. 48 and 49 illustrate a scenario where the rod segment is not a unified rigid rod. The rod segment in this version is actually a length of wire rope 182 with an expanded end fitting 184. The swaging operation for connecting this rod segment to anchor 40 is the same as for prior examples. End fitting 184 is placed inside extended distal wall 52. The extended distal wall is swaged inward to create the swaged interface 58 shown in FIG. 49. The many other variations illustrated previously can also be used to create a swaged connection to a rod segment containing a length of wire rope.

Figure 50:
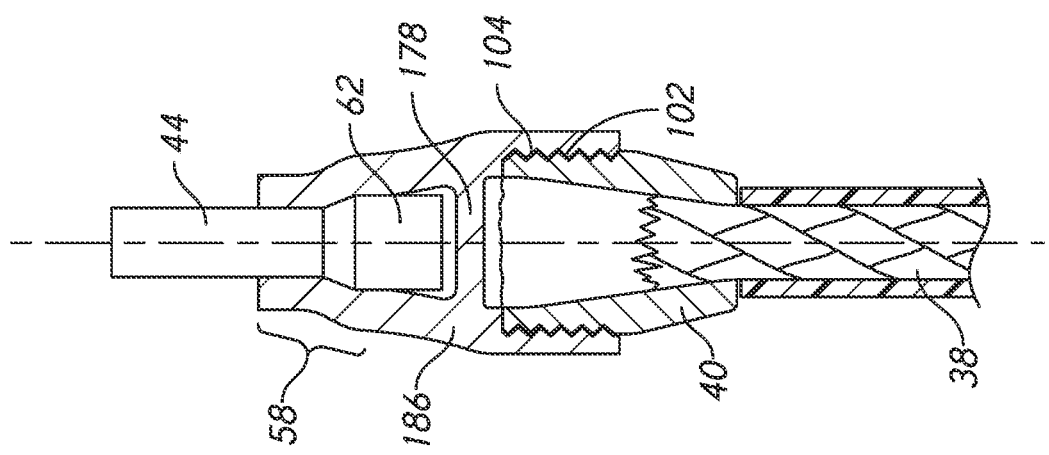
FIG. 50 is a sectional elevation view, showing the use of a swaging coupler having a transverse bulkhead.
Figure 52:
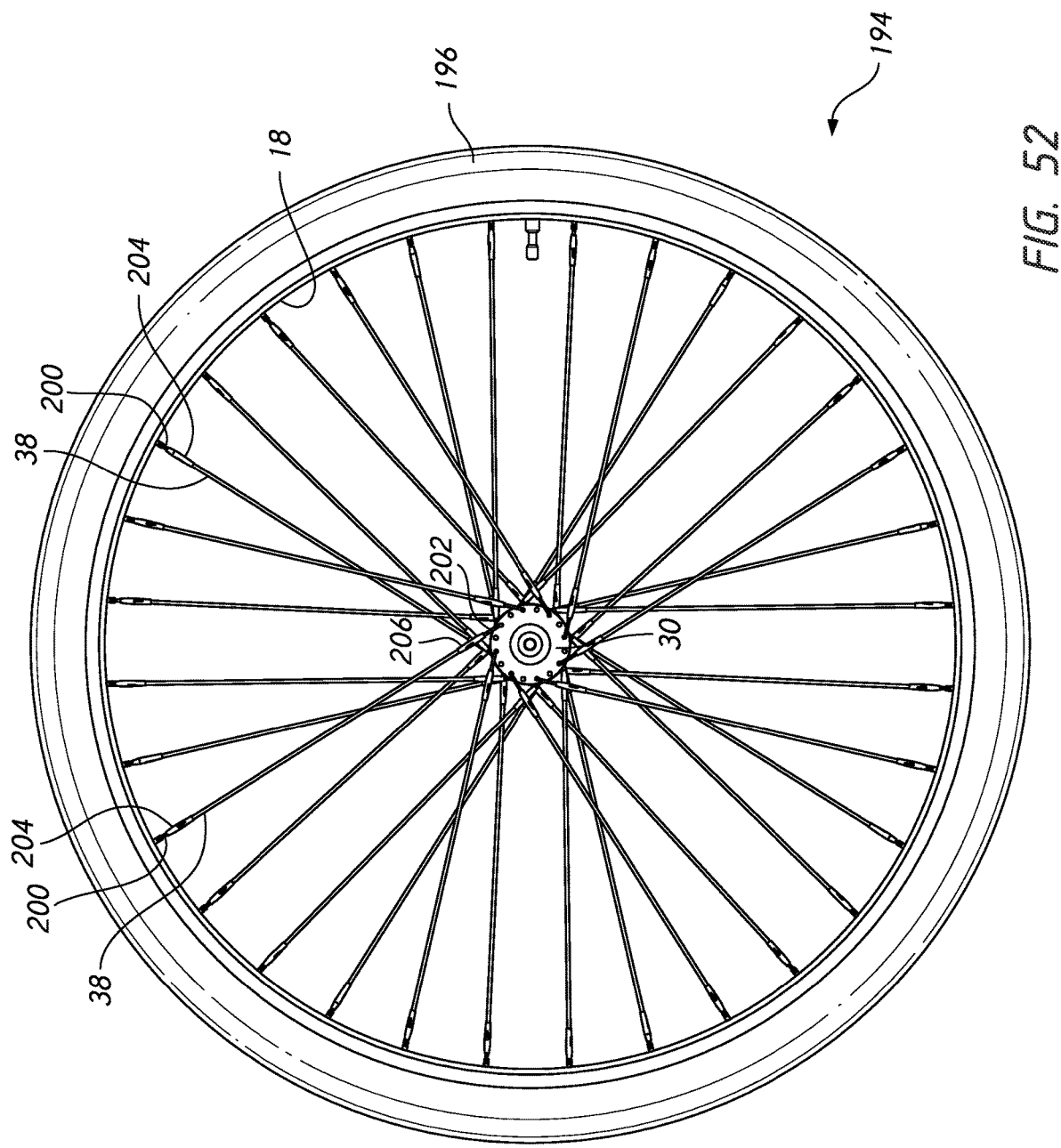
FIG. 52 is an elevation view, showing a wheel assembly made with hybrid spokes.
Figure 54:
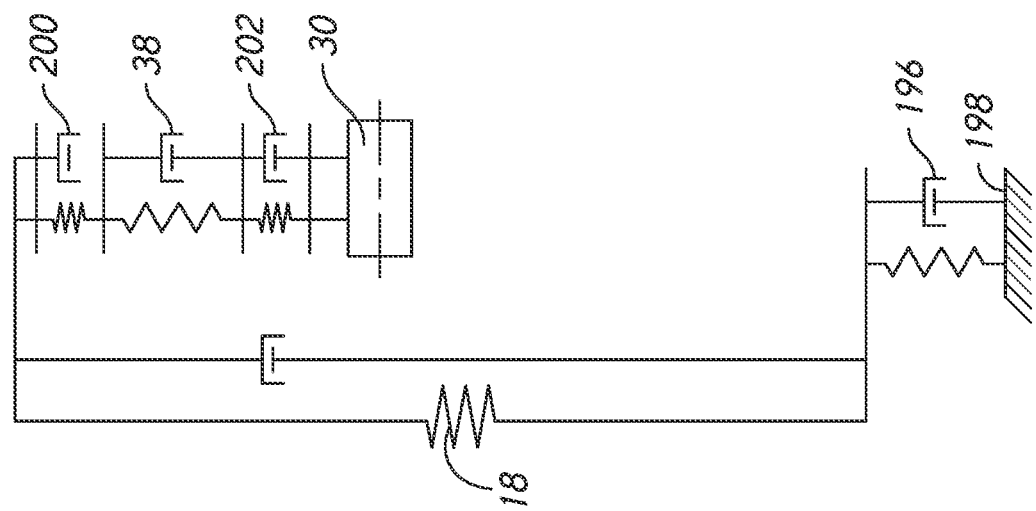
FIG. 54 shows a dynamic model of a simplified load path.
Figure 53:
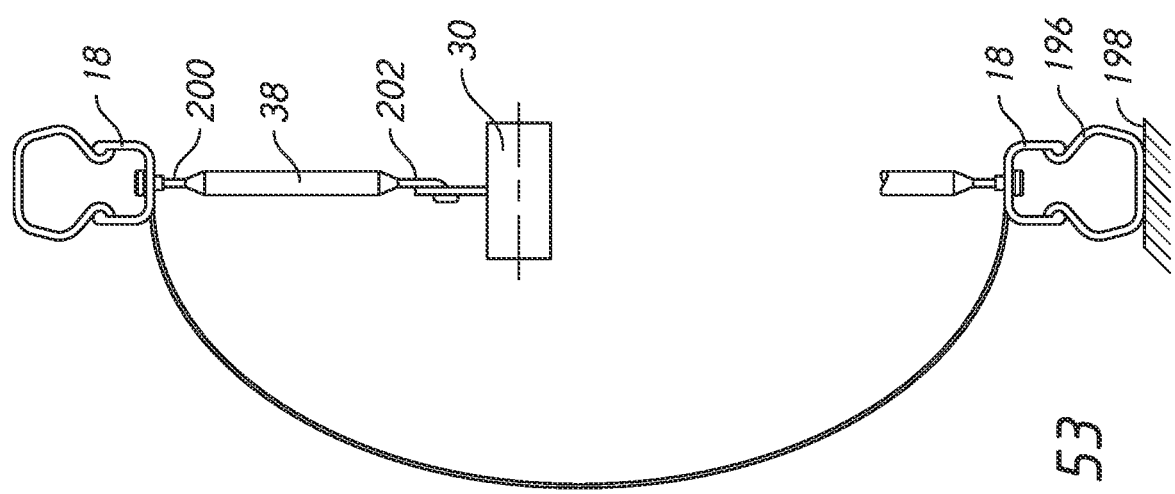
FIG. 53 is a simplified elevation view, showing how a bicycle wheel hub is supported by a spoke.
Figure 55:
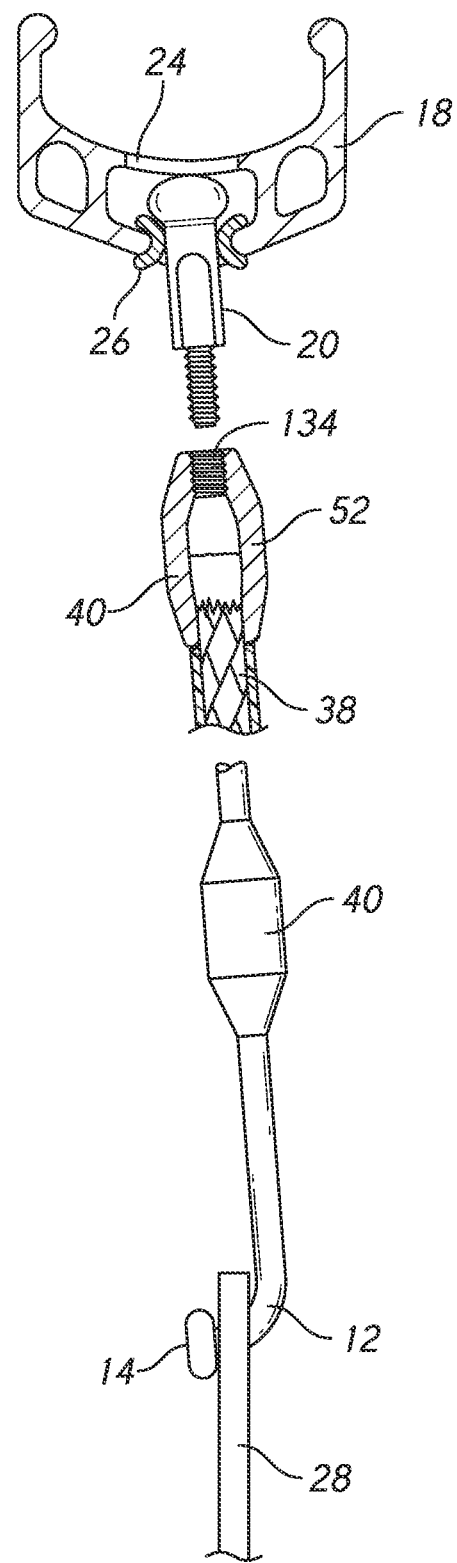
FIG. 55 is an elevation view, showing a hub, a rim, and spoke connected therebetween.
Figure 56:
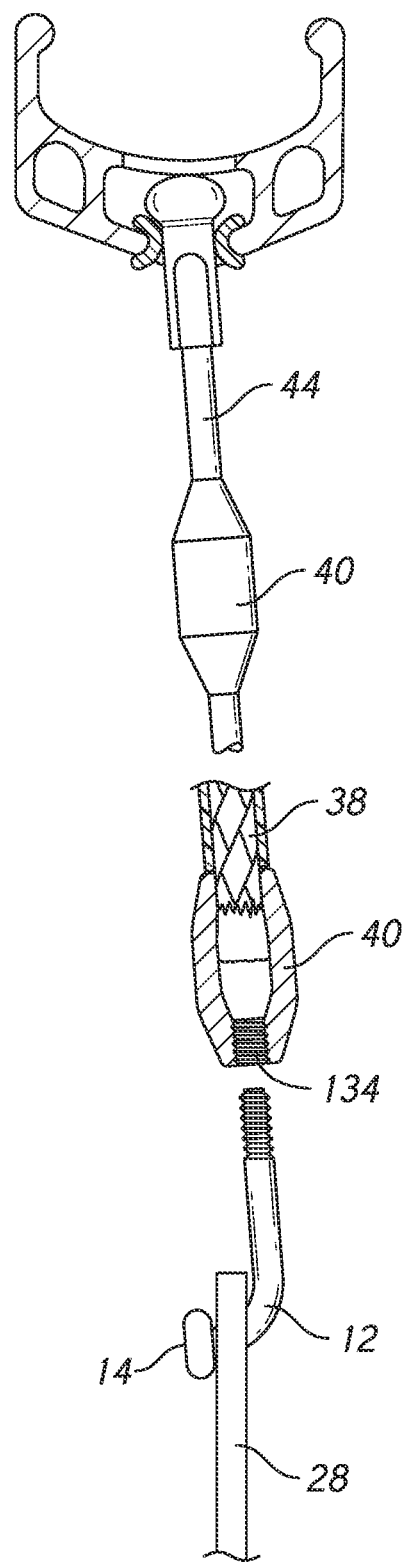
FIG. 56 is an elevation view, showing a hub, a rim, and spoke connected therebetween.

In fact, many of the prior exemplary features can be combined to produce additional embodiments within the scope of the present invention. FIG. 50 shows one such embodiment. In this version the anchor is split into two pieces—anchor 40 and coupler 186. A threaded interface 102,104 is used to join the coupler to the anchor. The coupler is provided with a transverse bulkhead 178. Rod end 44 is provided with an expanded portion 62, which is helpful in creating a tapered swaged interface as shown. Many, many other combinations of previously described features are possible.

Of course, all the rod segments have been shown being added to one end of a synthetic cable. In some applications a rod segment may in fact only be added to one end of a synthetic cable. However—in most applications—a rod segment will be added to both of the cable's ends. This allows the resulting assembly to be connected between two other external structures and secured and tightened using the standard end features incorporated in the two rod segments.

The combination of a synthetic tensile member with the two rod segments (one on each end) provides advantageous features. One example of an advantageous feature occurs when the assembly is used as a bicycle spoke. The hybrid assembly as contemplated by the present invention can be substituted for each spoke in a prior art bicycle wheel assembly. The resulting assembly has different mechanical characteristics.

Figure 51:
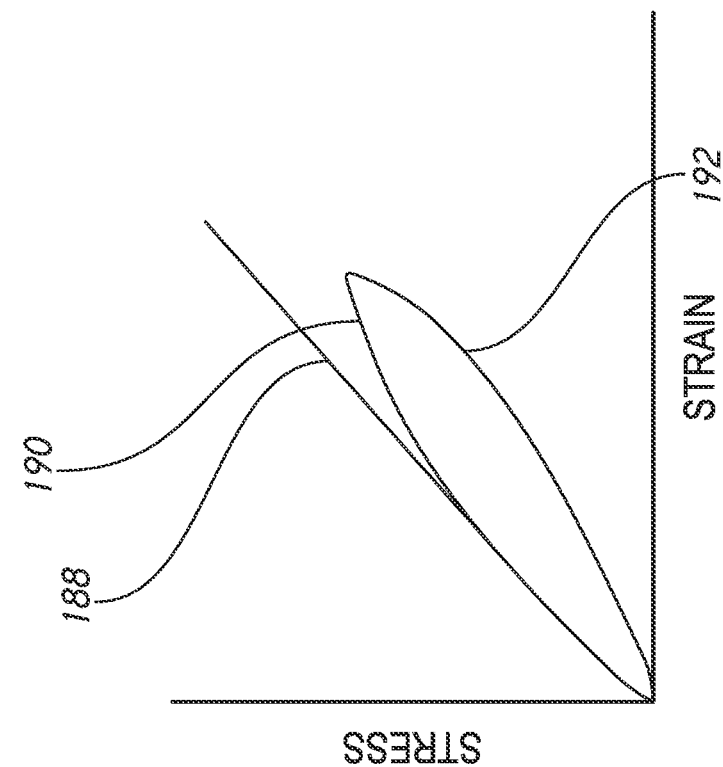
FIG. 51 is a stress versus strain plot.

FIG. 51 shows a stress versus strain diagram that will be familiar to those skilled in the art. Steel stress-strain-curve 188 shows the region of plastic elongation for a conventional steel spoke. Stress is proportional to strain. The relationship remains the same whether loading or unloading. The relationship is different, however, for a cable made of many types of synthetic filaments. Loading curves 190,192 show the stress-strain relationship for a cable made of synthetic filaments exhibiting viscoelastic properties. Synthetic loading curve 190 shows the stress-strain relationship during a phase in which load is being increased on the synthetic cable. Synthetic unloading curve 192 shows the stress-strain relationship when the load is being decreased on the cable. The displacement between the two curves is a result of viscoelasticity producing a hysteresis phenomenon. Heat is lost during a loading/unloading cycle for a viscoelastic material. Thus, the synthetic materials absorb energy during the loading cycle and shed some of this energy as heat. When such materials are used as bicycle spokes, the spokes are able to absorb some of the impact energy imparted to the wheel when traveling over bumps. The result is a noticeably smoother ride.

Many other advantages result from assemblies made according to the present invention. No attempt is made to enumerate this list of advantages. In addition—although an order of operations has been set forth in some of the examples given—the claims that follow should not be viewed as requiring any particular order of operations unless the claim language itself so requires.

Although the preceding description contains significant detail, it should not be construed as limiting the scope of the invention but rather as providing illustrations of the preferred embodiments of the invention. Those skilled in the art will be able to devise many other embodiments that carry out the present invention. Thus, the language used in the claims shall define the invention rather than the specific embodiments provided.

Having described my invention, I claim:

1. A method for making a wheel assembly, comprising:
 (a) providing a plurality of hybrid spokes, with each of said hybrid spokes being made by,
  (i) providing a synthetic cable, having an outer end and an inner end,
  (ii) providing an outer anchor and an inner anchor,
  (iii) creating a synthetic cable assembly by attaching said outer anchor to said outer end of said synthetic cable and attaching said inner anchor to said inner end of said synthetic cable,
  (iv) providing an inner rod segment having an outer end and an inner end,
  (v) providing an outer rod segment having an outer end and an inner end,
  (vi) after attaching said inner anchor to said synthetic cable, swaging said inner anchor to said outer end of said inner rod segment, (vii) after attaching said outer anchor to said synthetic cable, swaging said outer anchor to said inner end of said outer rod segment;
(b) providing a hub;
(c) providing a rim; and
(d) lacing said plurality of hybrid spokes between said hub and said rim.

2. The method for making a wheel assembly as recited in claim 1, further comprising for each of said hybrid spokes:
   (a) bedding said synthetic cable assembly before swaging said inner anchor to said outer end of said inner rod segment; and
   (b) bedding said synthetic cable assembly before swaging said outer anchor to said inner end of said outer rod segment.

3. The method for making a wheel assembly as recited in claim 2, further comprising for each of said hybrid spokes:
   after bedding said synthetic cable assembly adjusting a length of said swaged connection between said inner anchor and said inner rod segment in order to adjust an overall length for said hybrid spoke.

4. The method for making a wheel assembly as recited in claim 2, further comprising for each of said hybrid spokes:
   after bedding said synthetic cable assembly adjusting a length of said swaged connection between said outer anchor and said outer rod segment in order to adjust an overall length for said hybrid spoke.

5. The method for making a wheel assembly as recited in claim 3, further comprising for each of said hybrid spokes:
   after bedding said synthetic cable assembly adjusting a length of said swaged connection between said outer anchor and said outer rod segment in order to adjust an overall length for said hybrid spoke.

6. The method of making a wheel assembly as recited in claim 2 wherein said bedding includes applying tension until said synthetic cable assembly reaches a stable length.

7. The method of making a wheel assembly as recited in claim 1 wherein said connections between said anchors and said synthetic cable are made by potting.

8. A method for making a wheel assembly, comprising:
   (a) providing a plurality of hybrid spokes, with each of said hybrid spokes being made by,
      (i) providing a synthetic cable, having an outer end and an inner end,
      (ii) providing an outer anchor and an inner anchor,
      (iii) creating a synthetic cable assembly by attaching said outer anchor to said outer end of said synthetic cable and attaching said inner anchor to said inner end of said synthetic cable,
      (iv) providing an inner rod segment having an outer end and an inner end,
      (v) providing an outer rod segment having an outer end and an inner end,
      (vi) after attaching said inner anchor to said synthetic cable, creating an inner swaged connection between said inner anchor and said outer end of said inner rod segment,
      (vi) after attaching said outer anchor to said synthetic cable, creating an outer swaged connection between said outer anchor and said inner end of said outer rod segment;
   (b) providing a hub;
   (c) providing a rim; and
   (d) lacing said plurality of hybrid spokes between said hub and said rim.

9. The method for making a wheel assembly as recited in claim 8, further comprising for each of said hybrid spokes:

(a) bedding said synthetic cable assembly before attaching said inner anchor to said outer end of said inner rod segment; and
(b) bedding said synthetic cable assembly before attaching said outer anchor to said inner end of said outer rod segment.

10. The method for making a wheel assembly as recited in claim 9, further comprising for each of said hybrid spokes after bedding said synthetic cable assembly adjusting a length of said inner swaged connection between said inner anchor and said inner rod segment in order to adjust an overall length for said hybrid spoke.

11. The method for making a wheel assembly as recited in claim 9, further comprising for each of said hybrid spokes after bedding said synthetic cable assembly adjusting a length of said outer swaged connection between said outer anchor and said outer rod segment in order to adjust an overall length for said hybrid spoke.

12. The method for making a wheel assembly as recited in claim 8, wherein:
   (a) a first coupler is used to make said inner swaged connection between said inner anchor and said outer end of said inner rod segment; and
   (b) a second coupler is used to make said outer swaged connection between said outer anchor and said inner end of said outer rod segment.

13. The method of making a wheel assembly as recited in claim 9 wherein said bedding includes applying tension until said synthetic cable assembly reaches a stable length.

14. The method of making a wheel assembly as recited in claim 8 wherein said connections between said anchors and said synthetic cable are made by potting.

15. A method for making a wheel assembly, comprising:
   (a) providing a plurality of hybrid spokes, with each of said hybrid spokes being made by,
      (i) providing a synthetic cable, having an outer end and an inner end,
      (ii) providing an outer anchor and an inner anchor,
      (iii) creating a synthetic cable assembly by attaching said outer anchor to said outer end of said synthetic cable and attaching said inner anchor to said inner end of said synthetic cable,
      (iv) bedding said synthetic cable assembly in order to create a stable synthetic cable assembly length,
      (v) providing an inner rod segment having an outer end and an inner end,
      (vi) providing an outer rod segment having an outer end and an inner end,
      (vii) after attaching said inner anchor to said synthetic cable, attaching said inner anchor to said outer end of said inner rod segment,
      (viii) after attaching said outer anchor to said synthetic cable, attaching said outer anchor to said inner end of said outer rod segment,
      (ix) wherein said stable synthetic cable assembly length, said attachment between said inner anchor and said inner rod segment, and said attachment between said outer anchor and said outer rod segment are used to create a desired overall length for said hybrid spoke;
   (b) providing a hub;
   (c) providing a rim; and
   (d) lacing said plurality of hybrid spokes between said hub and said rim.

16. The method of making a wheel assembly as recited in claim 15 wherein said connections between said anchors and said synthetic cable are made by potting.

17. The method of making a wheel assembly as recited in claim 15 wherein said attachment between said inner anchor and said inner rod segment is made by swaging.

18. The method of making a wheel assembly as recited in claim 15 wherein said attachment between said outer anchor and said outer rod segment is made by swaging.

19. The method of making a wheel assembly as recited in claim 15 wherein said inner rod segment has a standard end fitting.

20. The method of making a wheel assembly as recited in claim 15 wherein said outer rod segment has a standard end fitting.

\* \* \* \* \*